(12) United States Patent
Miki et al.

(10) Patent No.: US 9,137,803 B2
(45) Date of Patent: Sep. 15, 2015

(54) RADIO COMMUNICATION CONTROL METHOD, BASE STATION APPARATUS AND MOBILE TERMINAL APPARATUS

(75) Inventors: Nobuhiko Miki, Tokyo (JP); Hiroyuki Ishii, Tokyo (JP); Naoto Okubo, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 600 days.

(21) Appl. No.: 13/521,229

(22) PCT Filed: Dec. 6, 2010

(86) PCT No.: PCT/JP2010/071839
§ 371 (c)(1),
(2), (4) Date: Nov. 20, 2012

(87) PCT Pub. No.: WO2011/083650
PCT Pub. Date: Jul. 14, 2011

(65) Prior Publication Data
US 2013/0070692 A1    Mar. 21, 2013

(30) Foreign Application Priority Data

Jan. 11, 2010    (JP) ................................. 2010-003494

(51) Int. Cl.
*H04W 72/04*    (2009.01)
*H04L 5/00*    (2006.01)
*H04W 72/02*    (2009.01)
(Continued)

(52) U.S. Cl.
CPC .............. *H04W 72/048* (2013.01); *H04L 5/001* (2013.01); *H04L 5/003* (2013.01); *H04W 8/06* (2013.01); *H04W 72/02* (2013.01); *H04W 72/0453* (2013.01); *H04W 88/08* (2013.01)

(58) Field of Classification Search
CPC ..... H04L 5/001; H04L 5/0053; H04L 5/0048; H04W 72/042; H04W 72/0453
See application file for complete search history.

(56) References Cited

U.S. PATENT DOCUMENTS

| 2011/0081913 A1* | 4/2011 | Lee et al. ........................ 455/450 |
| 2011/0103243 A1* | 5/2011 | Larsson et al. ................. 370/252 |
| 2011/0103333 A1* | 5/2011 | Berggren et al. .............. 370/329 |

(Continued)

OTHER PUBLICATIONS

International Search Report w/translation from PCT/JP2010/071839 dated Jan. 11, 2011 (4 pages).

(Continued)

*Primary Examiner* — Jung Park
(74) *Attorney, Agent, or Firm* — Osha Liang LLP

(57) ABSTRACT

The present invention provides a radio communication control method, in a communication system in which the system band is widened by aggregating a plurality of fundamental frequency blocks, that is suitable to transmit a downlink shared channel and its downlink control channel in different fundamental frequency blocks. According to this radio communication control method, a normal component carrier and an concatenated component carrier are selected for radio communication with a user terminal, and resources are allocated such that, in the event the user terminal is a terminal of LTE specifications which can support up to a fundamental frequency block, communication is made possible based on the LTE specifications using only the fundamental frequency block, and, in the event the user terminal is a terminal of the LTE-A specifications which can support up to the concatenated frequency block, communication is performed based on the LTE specifications using the concatenated frequency block.

9 Claims, 19 Drawing Sheets

(51) Int. Cl.
*H04W 8/06* (2009.01)
*H04W 88/08* (2009.01)

(56) References Cited

U.S. PATENT DOCUMENTS

2011/0113433 A1* 5/2011 Koyanagi et al. ............. 718/104
2012/0236803 A1* 9/2012 Vujcic .......................... 370/329

OTHER PUBLICATIONS

3GPP TSG RAN WG2 Meeting #68, R2-096485; "Non-accessible carriers in CA"; Huawei; Jeju, Korea, Nov. 9-13, 2009 (6 pages).

3GPP TSG-RAN2#68, R2-096976; "Non-accessible carriers in LTE-A"; NTT DoCoMo, Inc.; Jeju, South Korea; Nov. 9-13, 2009 (7 pages).

3GPP TR 25.912 V7.1.0; "3rd Generation Partnership Project; Technical Specification Group Radio Access Network; Feasibility study for evolved Universal Terrestrial Radio Access (UTRA) and Universal Terrestrial Radio Access Network (UTRAN) (Release 7)"; Sep. 2006 (57 pages).

Notification of Reasons for Rejection w/translation issued for Japanese Patent Application No. 2010-003494, dated Jul. 31, 2012, (7 pages).

* cited by examiner

CONVENTIONAL SPEC

| SYSTEM BANDWIDTH $N_{RB}^{DL}$ | RBG SIZE (P) |
|---|---|
| ≤10 | 1 |
| 11-26 | 2 |
| 27-63 | 3 |
| 64-110 | 4 |

FIG. 4

PROPOSED SPEC

| SYSTEM BANDWIDTH $N_{RB}^{DL}$ | RBG SIZE (P) |
|---|---|
| ≤10 | 1 |
| 11-49 | 2 |
| 50-74 | 3 |
| 75-110 | 4 |

FIG. 6

RADIO COMMUNICATION CONTROL METHOD, BASE STATION APPARATUS AND MOBILE TERMINAL APPARATUS

TECHNICAL FIELD

The present invention relates to a radio communication control method, a base station apparatus and a mobile terminal apparatus in a next-generation mobile communication system.

BACKGROUND ART

In a UMTS (Universal Mobile Telecommunications System) network, for the purposes of improving spectral efficiency and improving the data rates, system features of the third-generation system, which are based on W-CDMA (Wideband Code Division Multiple Access), are maximized by adopting HSDPA (High Speed Downlink Packet Access) and HSUPA (High Speed Uplink Packet Access). For this UMTS network, for the purposes of further increasing high-speed data rates, providing low delay and so on, long-term evolution (LTE) has been under study (see, for example, Non-Patent Literature 1). In LTE, as multiplexing schemes, OFDMA (Orthogonal Frequency Division Multiple Access), which is different from W-CDMA, is used on downlink channels (downlink), and SC-FDMA (Single Carrier Frequency Division Multiple Access) is used on uplink channels (uplink).

In the third-generation mobile communication system, it is possible to achieve a transmission rate of maximum approximately 2 Mbps on the downlink by using a fixed band of approximately 5 MHz. Meanwhile, in the system of LTE (Release 8), which is referred to as the 3.5-th generation, it is possible to achieve a transmission rate of about maximum 300 Mbps on the downlink and about 75 Mbps on the uplink by using a variable band which ranges from 1.4 MHz to 20 MHz. Furthermore, in the UMTS network, for the purpose of achieving further broadbandization and higher speed, successor systems of LTE have been under study (for example, LTE-Advanced (LTE-A or Release 10)). In the future, these multiple mobile communication systems are expected to coexist. There is a demand, for the LTE-A system that is currently under study, to guarantee backward compatibility with LTE.

CITATION LIST

Non-Patent Literature

Non-Patent Literature 1: 3GPP, TR25.912 (V7.1.0), "Feasibility study for Evolved UTRA and UTRAN," September 2006

SUMMARY OF INVENTION

Technical Problem

Now, in the LTE-A system, widening the band up to about 100 MHz is essential in order to meet the requirements of LTE-A. On the other hand, in the system band (entire signal band) for LTE-A system, support (backward compatibility) for LTE terminals (which satisfy the LTE specifications but does not support the LTE-A specifications) is required. Consequently, there are rules to form the LTE-A system band with a plurality of fundamental frequency blocks (referred to as "component carriers" in LTE-A) and make each component carrier have a bandwidth that can be used in LTE (maximum 20 MHz).

In LTE-A, guard bands are inserted between neighboring component carriers, and a plurality of component carriers are placed in the system band such that the interval between the center frequencies of the component carriers is a multiple of 300 kHz. When a plurality of component carriers are placed in the system band, some blank band is produced due to the influence of the bandwidth of the component carriers and guard bands. Not much consideration has been given as to how to make use of this blank band.

The present invention has been made taking into account the above points, and it is therefore an object of the present invention to provide a radio communication control method, a base station apparatus and a mobile terminal apparatus that make possible effective use of blank band that is produced when a plurality of component carriers are placed in a system band.

Solution to Problem

The base station apparatus according to the present invention has: a selection section that, where a fundamental frequency block which corresponds to an existing system band, and an concatenated frequency block which is formed by concatenating an additional carrier to the existing system band, are located on a frequency axis, selects the fundamental frequency block or the concatenated frequency block for radio communication with a user terminal; a resource allocation section that performs resource allocation such that, when the user terminal is a terminal of a first specification and is able to support up to the fundamental frequency block, communication is performed based on the first specification using only the fundamental frequency block, and, when the user terminal is a terminal of a second specification and is able to support up to the concatenated frequency block, communication is performed based on the second specification using the concatenated frequency block; and a communication section that performs radio communication with the user terminal in accordance with the resource allocation by the resource allocation section.

Technical Advantages of Invention

According to the present invention, it is possible to provide a radio communication control method, a base station apparatus and a mobile terminal apparatus that can make effective use of blank band in a widened system band.

BRIEF DESCRIPTION OF DRAWINGS

FIG. 4 is a diagram showing a table structure defined in LTE;

FIG. 6 is a diagram showing a table structure according to the present embodiment;

DESCRIPTION OF EMBODIMENTS

Figure 1:
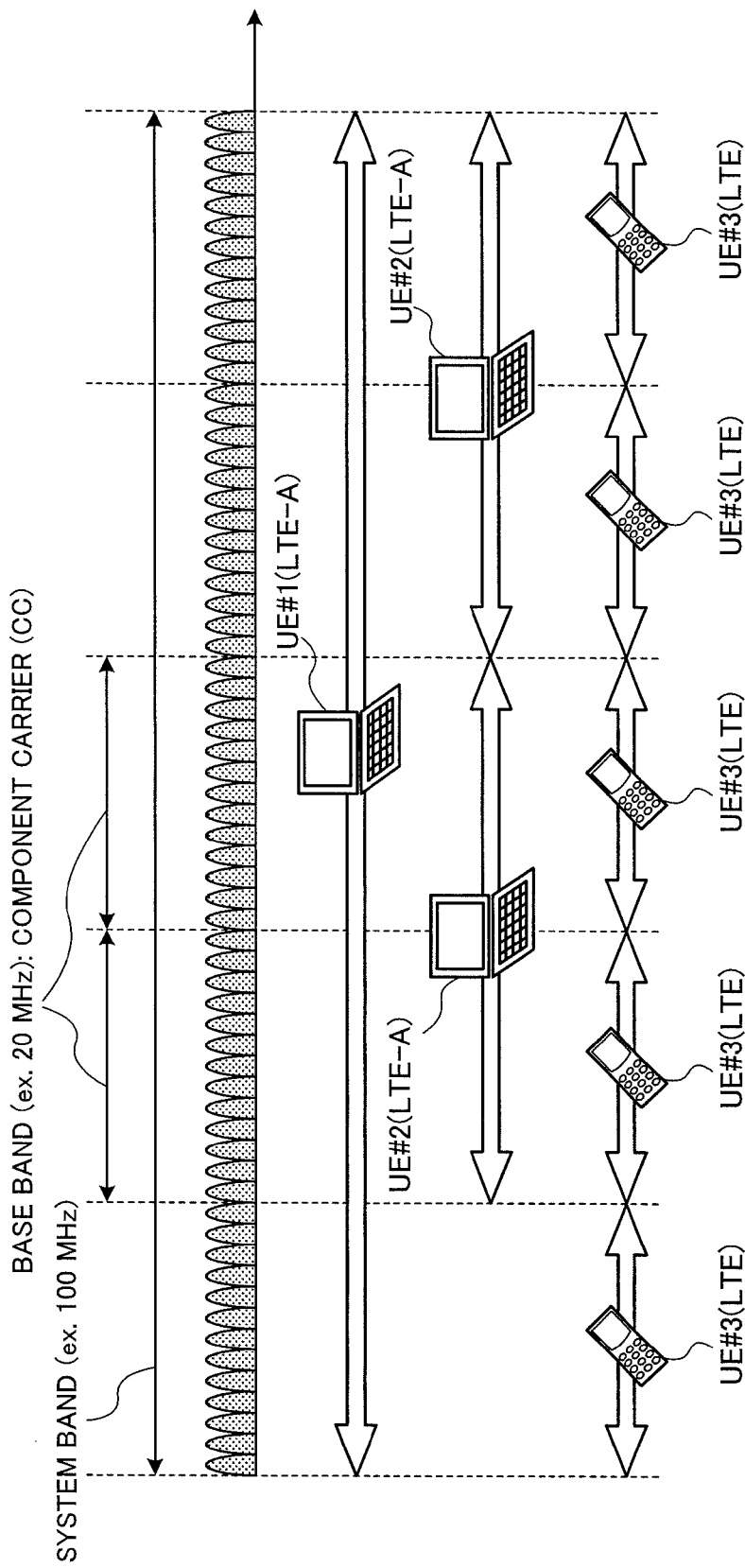
FIG. 1 is a diagram showing a layered bandwidth configuration defined in LTE-A.

FIG. 1 is a diagram showing a layered bandwidth configuration defined in LTE-A. The example of FIG. 1 illustrates a layered bandwidth configuration where an LTE-A system, which is the first mobile communication system having the first system band that is formed with a plurality of fundamental frequency blocks, and an LTE system, which is a second mobile communication system having a second system band that is formed with one component carrier, coexist. In the LTE-A system, for example, radio communication is performed in a variable system bandwidth of 100 MHz or below, and, in the LTE system, radio communication is performed in a variable system bandwidth of 20 MHz or below. The system band of the LTE-A system is at least one component carrier, where the system band of the LTE system is one unit. Widening the band by way of gathering a plurality of component carriers in this way is referred to as "carrier aggregation."

For example, in FIG. 1, the system band of the LTE-A system is a system band to include bands of five component carriers (20 MHz×5=100 MHz), where the system band (base band: 20 MHz) of the LTE system is one component carrier. In FIG. 1, mobile terminal apparatus UE (User Equipment) #1 is a mobile terminal apparatus to support the LTE-A system (and also support the LTE system), and supports a system band up to 100 MHz. UE #2 is a mobile terminal apparatus to support the LTE-A system (and also support the LTE system), and supports a system band up to 40 MHz (20 MHz×2=40 MHz). UE #3 is a mobile terminal apparatus to support the LTE system (and not support the LTE-A system), and supports a system band up to 20 MHz (base band).

The present inventor has focused on the fact that blank band is produced when a plurality of component carriers are placed in a widened system band, and has arrived at the present invention by contemplating a system configuration for concatenating an additional carrier to a component carrier to fill in that blank band efficiently and using these concatenated carriers as one component carrier. By concatenating an additional carrier to an existing component carrier, it is possible to realize a communication control method that can solve the drawbacks due to excess of the maximum bandwidth (20 MHz) which an LTE terminal can use.

Hereinafter, an additional carrier to be concatenated to an existing component carriers will be referred to as a "carrier segment," and a component carrier in which a carrier segment is concatenated to an existing component carrier will be referred to as a "concatenated component carrier." Also, an individual existing component carrier to which a carrier segment is not concatenated, will be referred to as a "normal component carrier" or "stand-alone component carrier."

According to one aspect of the present invention, communication control on the downlink and uplink is performed such that a carrier segment is not used as a stand-alone carrier, and is always placed to be concatenated to an end of a normal component carrier to form one component carrier with the normal component carrier, and the concatenated component carrier and the normal component carrier are allocated, without drawing distinction between an LTE terminal and LTE-A terminal, so that an LTE terminal, to which the concatenated component carrier is allocated, is able to function in the same way as when the normal component carrier is allocated, and an LTE-A terminal, to which the concatenated component carrier is allocated, is able to make use of the entirety, including the carrier segment.

By this means, even when a normal component carrier which an LTE terminal can use and a concatenated component carrier which exceeds the maximum width which the LTE terminal can use coexist, it is possible to support both an LTE terminal and an LTE-A terminal, fill in blank band in the system band efficiently and make efficient use of carriers.

Figure 2:
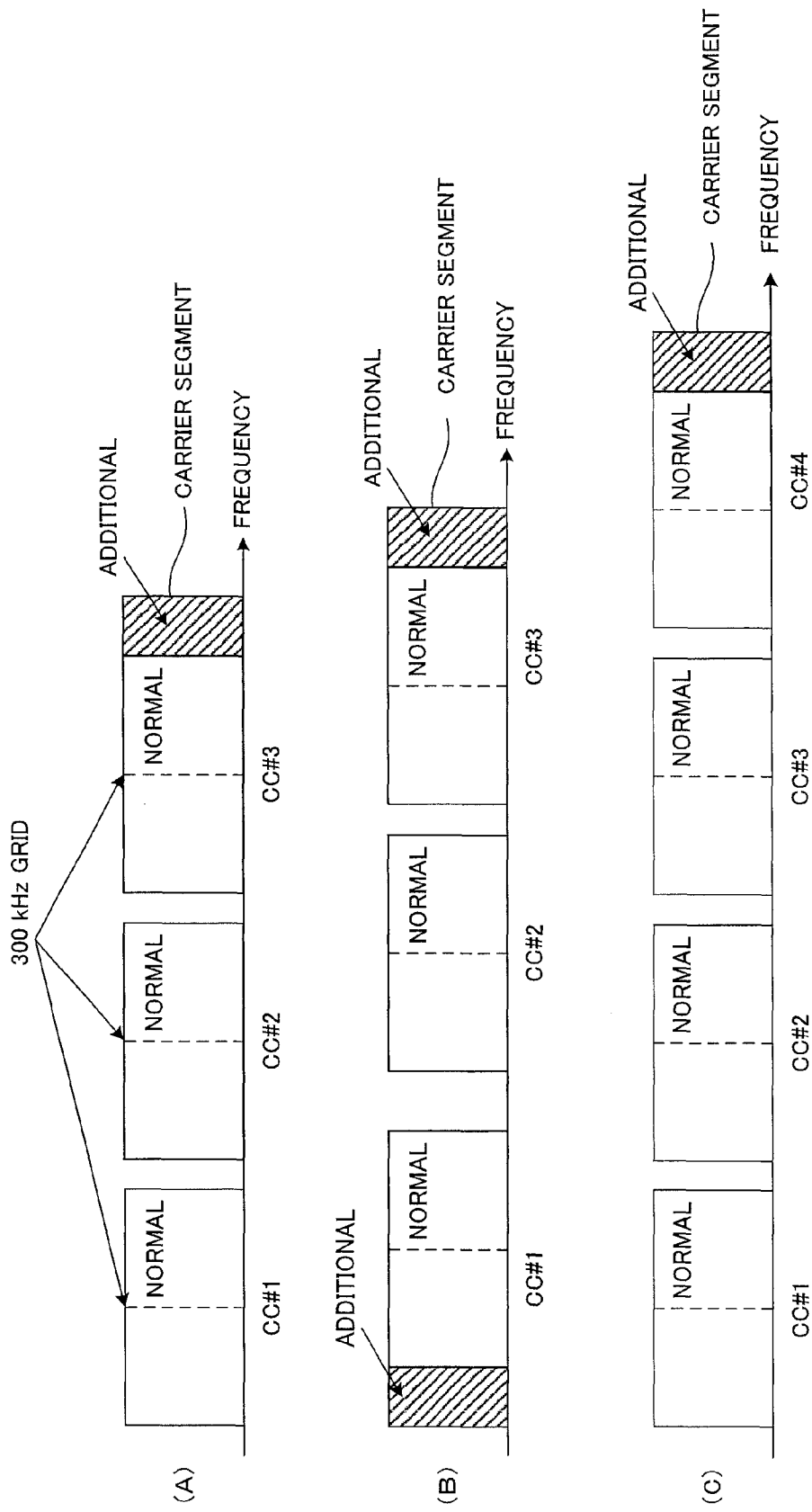
FIG. 2 provides diagrams showing examples of arrangement of a plurality of component carriers including concatenated component carriers.

Next, a communication control method to efficiently fill in blank band that is produced when a plurality of component carriers are placed in a widened system band, will be described in detail. FIGS. 2(A), (B) and (C) are diagrams to show examples of arrangement of a plurality of component carriers including concatenated component carriers.

In the example of component carrier arrangement illustrated in FIG. 2(A), two stand-alone component carriers CC #1 and CC #2, and one concatenated component carrier CC #3, are arranged to cover the entire signal band. Three component carriers CC #1 to CC #3 are arranged over the entire signal band such that the interval between the center frequencies of the normal component carrier parts is a multiple of 300 kHz. In concatenated component carrier CC #3, which is placed at the right end of the entire signal band, a carrier segment (for example, 1.4 MHz), which is an additional carrier, is arranged to continue with the right end of the normal component carrier part (for example, 20 MHz), thereby constituting, for example, concatenated component carrier CC #3 of 21.4 MHz.

In the example of component carrier arrangement illustrated in FIG. 2(B), although three component carriers CC #1 to CC #3 are provided similar to FIG. 2(A), two concatenated component carriers CC #1 and CC #3, and one stand-alone component carrier CC #2, are combined. Three component carriers CC #1 to CC #3 are arranged over the entire signal band such that the interval between the center frequencies of the normal component carrier parts is a multiple of 300 kHz. Concatenated component carriers CC #1 and CC #3 are arranged at both ends of the entire signal band, where concatenated component carrier CC #1 on the lower band side has a carrier segment placed to continue with its lower band end, and concatenated component carrier CC #3 on the higher band side has a carrier segment placed to continue with its higher band end.

In the example of component carrier arrangement illustrated in FIG. 2(C), three independent component carriers CC #1 to CC #3 and one concatenated component carrier CC #4 are combined. Four component carriers CC #1 to CC #4 are arranged over the entire signal band such that the interval between the center frequencies of the normal component carrier parts is a multiple of 300 kHz. Concatenated component carriers CC #4, which is placed at the right end of the entire signal band, has a carrier segment placed to continue with the higher band end of the normal component carrier.

As illustrated in FIGS. 2(A), (B) and (C), a carrier segment is always placed to neighbor and continue with a normal component carrier, and, by being concatenated to the normal component carrier, constitutes one component carrier.

In this way, when a carrier segment and a normal component carrier are concatenated and form one component carrier, it is not necessary to newly define the carrier segment as a stand-alone component carrier, and therefore it is possible to reduce the number of options.

Figure 3:
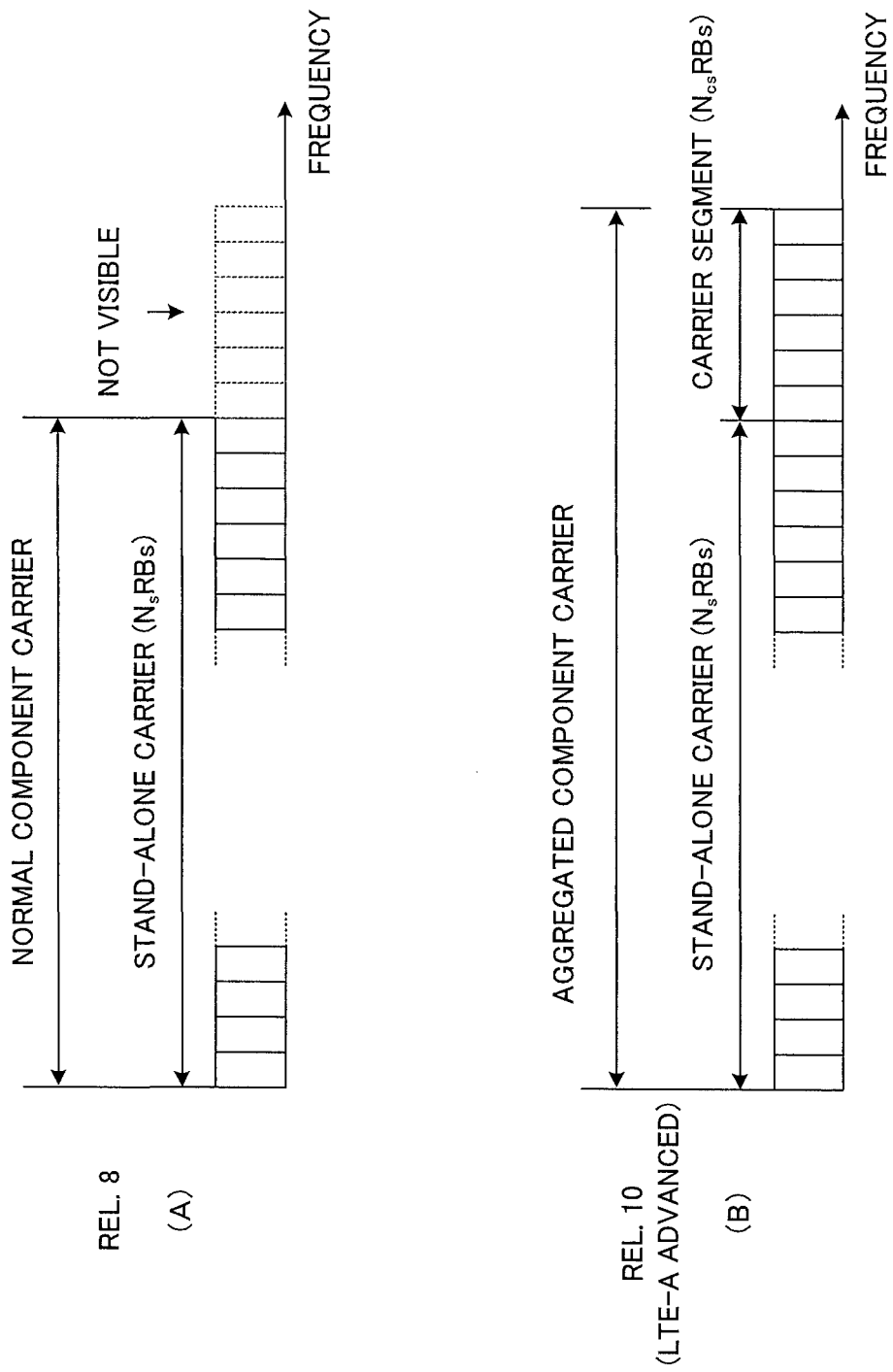
FIG. 3(A) is a diagram showing a system band which an LTE terminal recognizes with respect to a concatenated component carrier.
FIG. 3(B) is a diagram showing a system band which an LTE-A terminal recognizes with respect to a concatenated component carrier.

Also, even when a carrier segment is concatenated to a normal component carrier to form a concatenated component carrier, if an LTE terminal recognizes the concatenated component carrier as a normal component carrier as illustrated in FIG. 3(A) and an LTE-A terminal recognizes the concatenated component carrier as illustrated in FIG. 3(B), it is possible to realize backward compatibility with LTE and realize effective use of carriers.

The radio base station controls communication (that is, controls resources) such that, even when a concatenated component carrier is allocated to an LTE terminal, the LTE terminal recognizes the concatenated component carrier as a normal component carrier and implements operations in accordance with the LTE specifications, and controls communication (that is, controls resources) such that, even when a concatenated component carrier is allocated to an LTE-A terminal, the LTE-A terminal is able to make effective use of the entire concatenated component carrier. Now, specific examples of resource operations will be described below.

When a concatenated component carrier is allocated without drawing distinction between an LTE terminal and an LTE-A terminal, applying the LTE specifications on an as-is basis only makes resource block allocation signaling complex.

Although a PDSCH and PUSCH, which are physical channels to transmit user data, are basically subject to localized transmission, the minimum unit of radio resource allocation, which is a block of consecutive subcarriers and referred to as a "resource block" (RB), is defined to carry out localized transmission-based radio resource allocation efficiently. In LTE, 1 RB is formed with 12 subcarriers×14 OFDM symbols, and, for the number of RBs to constitute the system band, six types {6, 15, 25, 50, 75, 100} are defined. For example, in the event of a 5-MHz system band, 25 consecutive RBs are allocated, and in the event of a 20-MHz system band, 100 consecutive RBs are allocated.

Figure 5:
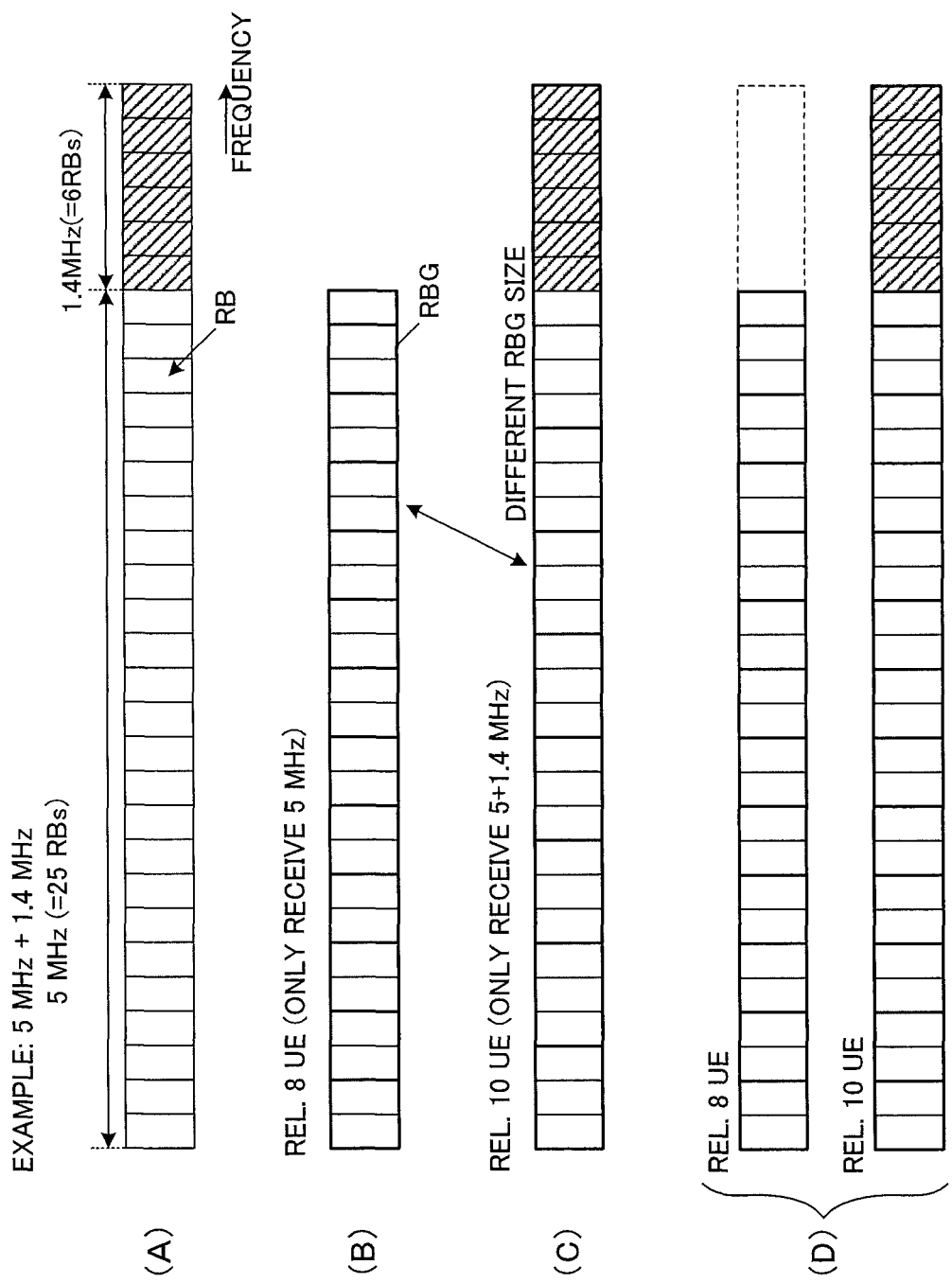
FIG. 5(A) is a configuration diagram of a concatenated component carrier.
FIG. 5(B) is a configuration diagram of a normal component carrier.
FIG. 5(C) is a conceptual diagram in which a concatenated component carrier is segmented by an RBG size of 3.
FIG. 5(D) is a diagram in which a concatenated component carrier and normal component carrier are segmented by an RBG of the same size.

Although RB allocation information needs to be notified from the radio base station apparatus to a terminal, RBG (Resource Block Group) is defined in order to reduce overhead. That is to say, as illustrated in FIG. 4, a table which associates the system bands (the numbers of RBs) and RBG sizes is defined, and RB allocation information is notified by grouping RB groups determined by the RBG size are into one. However, if the RBG size is determined using the table (LTE specification) illustrated in FIG. 4, depending on the system band, the RBG size varies between a normal component carrier and a concatenated component carrier. For example, as illustrated in FIG. 5(A), in the event of a concatenated component carrier formed by adding a 1.4-MHz carrier segment to a 5-MHz normal component carrier, the number of RBs is 25 with respect to the normal component carrier part, and, according to the table of FIG. 4, the RBG size is 2 (FIG. 5(B)). On the other hand, looking at the entirety (concatenated component carrier) including the carrier segment, the number of RBs is 31 (=25+6), and so, according to the table of FIG. 4, the RBG size is 3 (FIG. 5(C)). Consequently, although "2" is reported as the RBG size to an LTE terminal, "3" needs to be notified as the RBG size to an LTE-A terminal. In this way, if the RBG size is determined using the LTE-specification table illustrated in FIG. 4, resource block allocation in the scheduler becomes complex, or unallocated RBs are produced, which damages efficiency.

The present invention therefore proposes a table structure that is improved to solve the complexity and low efficiency of resource block allocation signaling. That is to say, the relationship of association between the system band (the number of RBs) and the RBG size is corrected (see FIG. 6) such that the RBG size does not vary between a normal component carrier (the number of Ns RBs) and an concatenated component carrier (the number of RBs=Ns+Ncs), in which a carrier segment (the number of RBs=Ncs) is concatenated to that normal component carrier (the number of RBs=Ns).

By determining the RBG size based on this table, as illustrated in FIG. 5(D), the RBG size to be determined in association with the system band of a normal component carrier (5 MHz) becomes "2" (for an LTE terminal), and the RBG size to be determined in association with the system band of a concatenated component carrier (5.14 MHz) becomes "2." Consequently, it is possible to make the RBG size the same between an LTE terminal and an LTE-A terminal.

FIG. 6 is a diagram to show a table structure improved to allow RBG allocation to make the RBG size the same between an LTE terminal and an LTE-A terminal. In LTE, the system band (the number of RBs) varies in six steps, namely, the number of RBs=6 (1.4 MHz), the number of RBs=15 (3 MHz), the number of RBs=25 (5 MHz), the number of RBs=50 (10 MHz), the number of RBs=75 (15 MHz), and the number of RBs=100 (20 MHz). So, in areas where the system band (the number of RBs) is equal to or greater than the number of RBs=11, the RBG size is controlled not to change until the system band (the number of RBs) becomes the next step.

By this means, within a scope not exceeding the size of a normal component carrier to which a carrier segment is destined to be concatenated, it is possible to use the same RBG size between LTE and LTE-A. Note that, in the event a carrier segment exceeds the size of the normal component carrier to which the carrier segment is destined to be concatenated, it suffices to only add one normal component carrier of the same size, so that the carrier segment does not exceed the size of the normal component carrier.

For example, in the table illustrated in FIG. 6, when the system band exceeds the number of RBs=10, RBG size is maintained 2 until the system band reaches the number of RBs=50 (10 MHz), so that, even if a carrier segment of the number of RBs=6 is added to a normal component carrier in which the system band is the number of RBs=25, the RBGs to allocate become the same size between an LTE terminal and an LTE-A terminal.

Consequently, when the radio base station allocates concatenated component carriers to terminals, the RBG size upon resource block allocation becomes the same size between an LTE terminal and an LTE-A terminal, so that it is possible to prevent resource block allocation from being complex or inefficient.

Also, a PDCCH for transmitting downlink control information is placed in the top first to third OFDM symbols of a component carrier. When a PDCCH is transmitted by a carrier segment of a concatenated component carrier, an LTE terminal is unable to receive the PDCCH, which results in the situation where the PDSCH and PUSCH cannot be decoded. So, control to transmit the PDCCH using the normal component carrier part alone and not to transmit the PDCCH by the carrier segment is necessary. However, in the event there is provision not to allocate a PDCCH to a carrier segment, cases might occur where the PDSCH starting position varies between RBs.

In the event a concatenated component carrier is formed by concatenating a carrier segment to a normal component carrier, the present invention allocates a control channel to the normal component carrier alone and maps user data to LTE-A terminals, in order, such that the top RB of the carrier segment is the starting position of the shared data channel. Alternately, in the carrier segment, no transmission is performed until the symbol position where a control channel is allocated, and the starting position of the PDSCH in the carrier segment is aligned with the normal component carrier.

Figure 7:
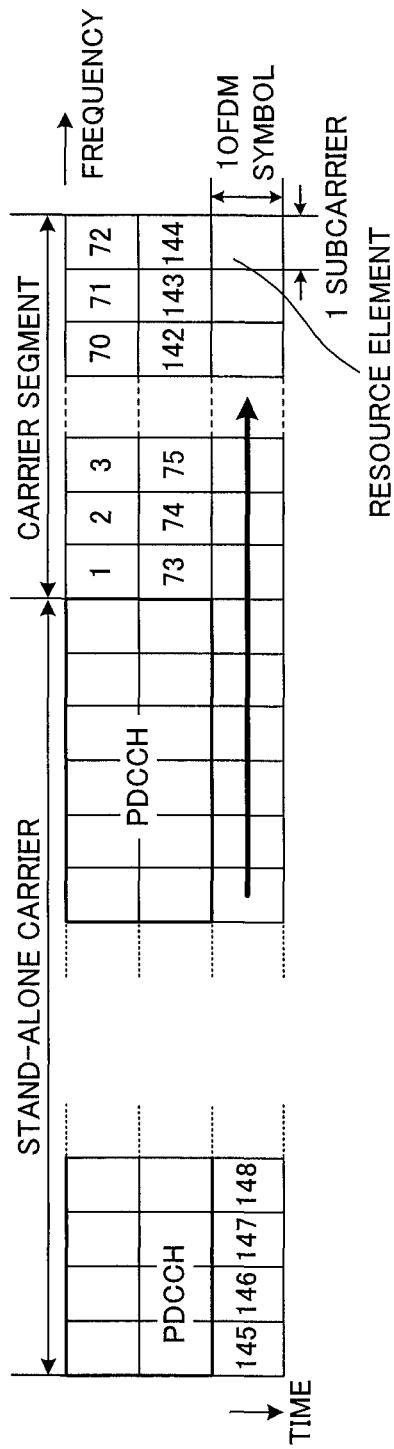
FIG. 7 is a diagram showing a mapping method to make the top RB of a carrier segment the starting position of a shared data channel according to the present embodiment.

FIG. 7 illustrates a method of performing mapping in order by making the top RE (Resource Element, which is formed with 1 subcarrier×1 OFDM symbol) of a carrier segment the starting position of the shared data channel. According to the resource allocation method illustrated in this drawing, resource allocation is controlled such that a PDCCH, which is a control channel, is transmitted by the top first and second OFDM symbols of a normal component carrier, and, in a carrier segment, the PDCCH is not transmitted by the top first and second OFDM symbols. A PDSCH, which is a shared data channel, is mapped sequentially by making the top RE of the carrier segment the starting position. Then, after mapping is performed up to the rearmost end (RE=144) of the carrier segment, mapping is performed in order in the frequency direction, from the mapping position of the third OFDM symbol (the subsequent symbol of the first and second OFDM symbols where the control channel is allocated), which is the top position (RB=145) of the normal component carrier in the frequency domain. The PDSCH is mapped to up to the carrier segment. However, an LTE terminal is unable to recognize the carrier segment, and therefore the shared data channel is not mapped to the carrier segment.

In this way, in the event of a concatenated component carrier in which a carrier segment is concatenated to a normal component carrier, like the LTE specifications, a control channel is transmitted by the normal component carrier part alone (3 OFDM symbols form the top "1") and is not transmitted by the carrier segment, so that, no matter what component carrier configuration is employed, it is possible to accommodate the control channel in the normal component carrier.

FIGS. 8(A) and 8(B) illustrate resource allocation methods to perform mapping by aligning the starting position of a PDSCH in a carrier segment with a normal component carrier. FIG. 8(A) is an example of allocating two OFDM symbols to a control channel, and FIG. 8(B) is an example of allocating three OFDM symbols to a control channel. These resource allocation methods transmit a PDCCH, which is a control channel, in the normal component carrier part (the top first to third OFDM symbols), but do not transmit the PDCCH in the carrier segment. Also, a non-transmission period, in which a PDSCH, which is a shared data channel, is not transmitted, is provided up to the position of the same OFDM symbol (the second or third OFDM symbol from the top of the carrier segment) as the OFDM symbol to which the control channel is allocated, in the normal component carrier part. Then, by aligning the starting position of the PDSCH in the carrier segment with the normal component carrier, the second OFDM symbol (FIG. 8(A)) or the third OFDM symbol (FIG. 8(B)) is used. However, an LTE terminal cannot recognize the carrier segment, and therefore the shared data channel is not allocated to the carrier segment.

In this way, by providing a non-transmission period, in which a shared data channel is not transmitted in a carrier segment, up to the top several OFDM symbols to which a control channel is allocated, in a normal component carrier part, and by controlling resource allocation such that the starting position of a PDSCH is aligned between the carrier segment and the normal component carrier, resource allocation in accordance with the LTE specifications is made possible.

Also, in the LTE specifications, two types of control information are defined, namely user-common control information and user-specific control information. The number of bits for these control information is determined by the number of RBs (which will be described later), and so determining the number of user-common control information bits including the carrier segment results in the problem of making an LTE terminal unable to receive. Consequently, control to transmit user-common control information in a normal component carrier alone and transmit a user-specific PDCCH to an LTE-A terminal using up to a carrier segment, may be adequate. Now, detailed descriptions will be given below.

Figure 9:
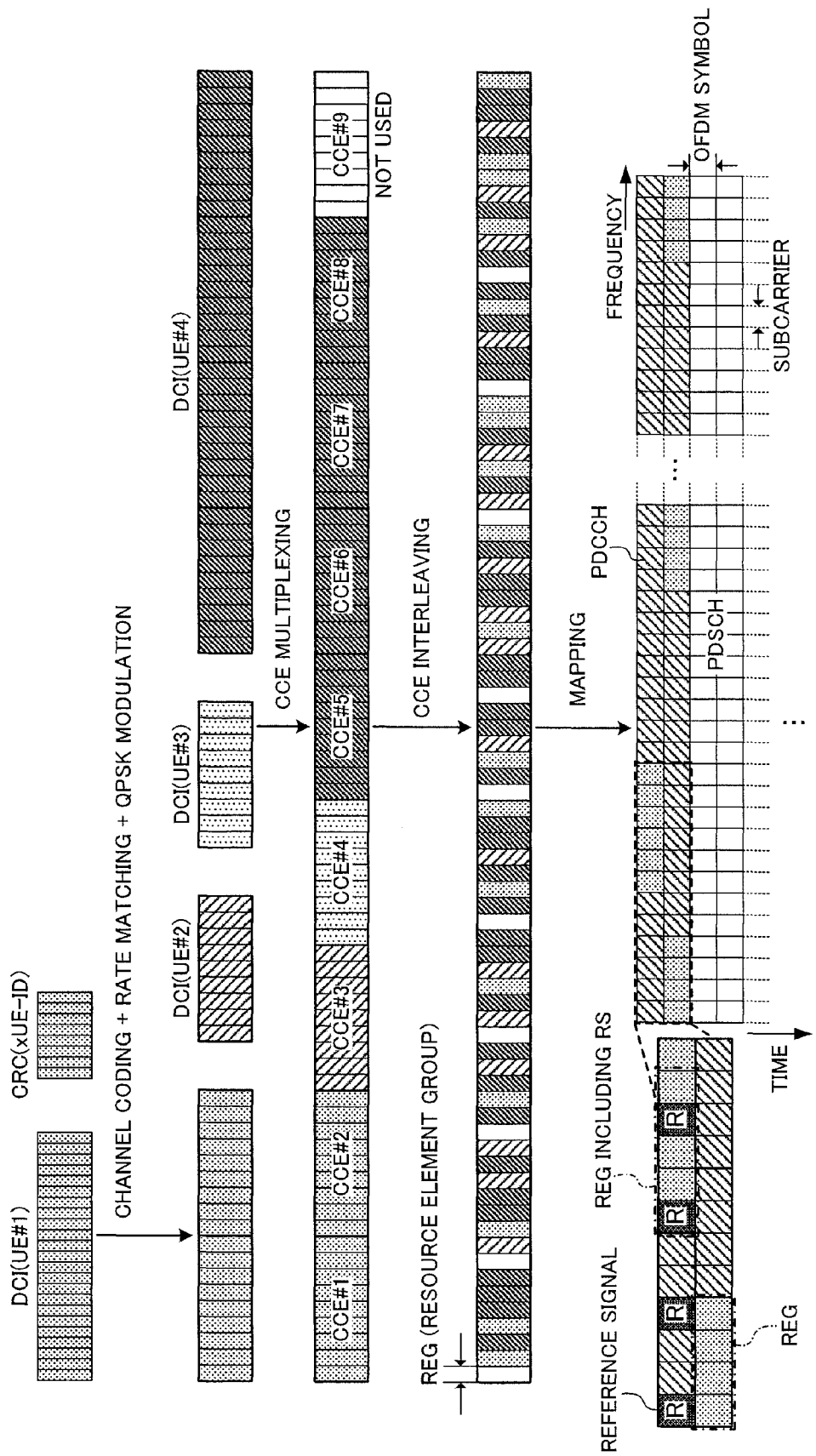
FIG. 9 is a conceptual diagram of PDCCH transmission according to LTE specifications.
Figure 10:
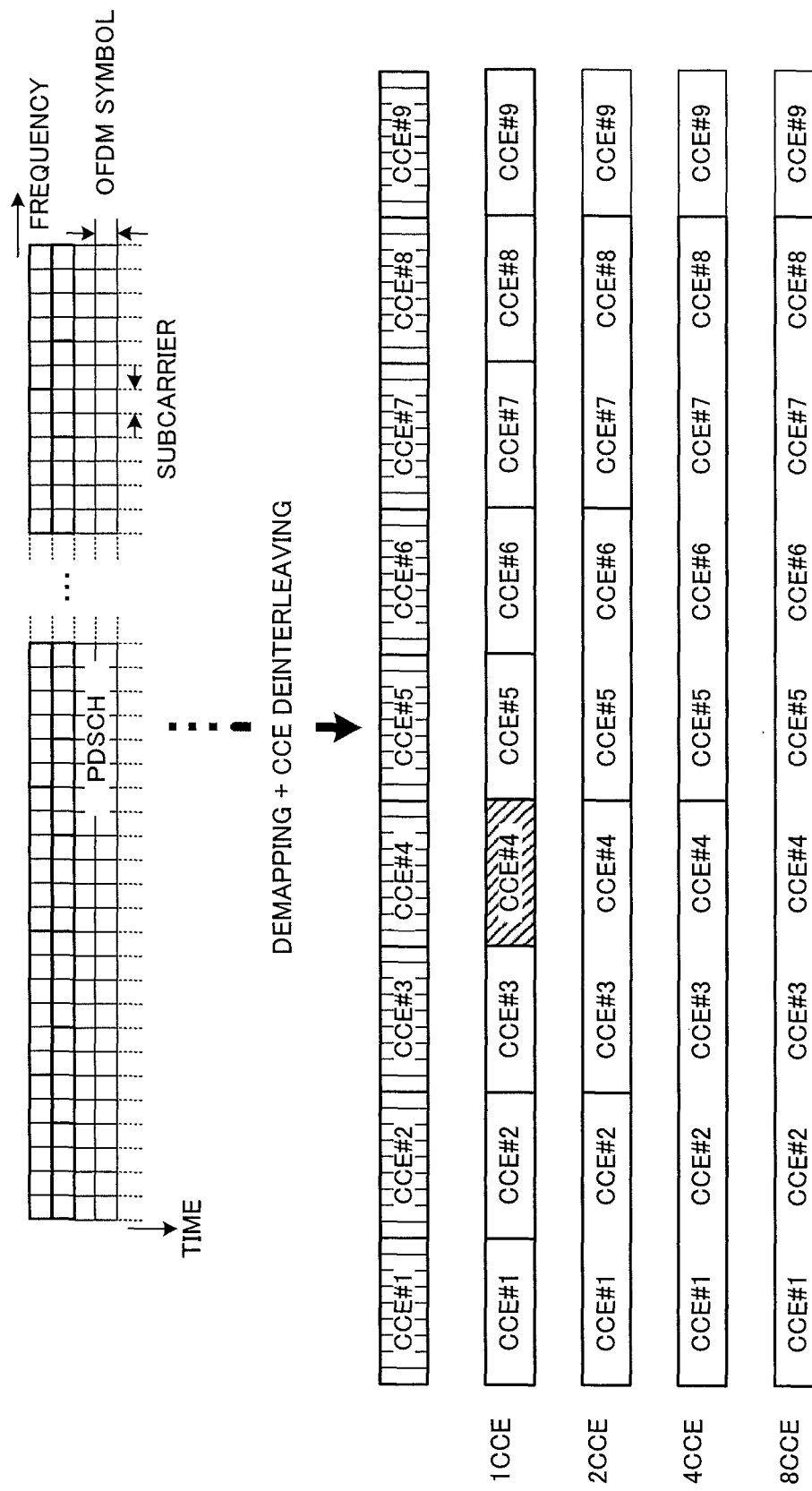
FIG. 10 is a conceptual diagram of PDCCH reception according to LTE specifications.

FIG. 9 is a conceptual diagram of PDCCH transmission according to the LTE specifications, and FIG. 10 is a conceptual diagram of PDCCH reception. As illustrated in FIG. 9, a radio base station adds a CRC, which is masked by a user ID (UE-ID), to downlink control information (DCI) for user terminals multiplexed over the same subframe, and then performs channel coding. Also, rate matching to 72, 144, 288 or 576 bits is performed, depending on the reception quality of each user terminal (72 bits and 576 bits match the coding rates of 2/3 and 1/12). Here, 72 bits are defined as a fundamental unit (CCE: Control Channel Element), and an optimal number of CCEs is determined from four types of numbers of CCEs defined, namely {1, 2, 4, 8}, depending on reception quality. Furthermore, after QPSK modulation, control information for a plurality of user terminals is multiplexed (CCE multiplexing), and, in order to achieve a frequency diversity effect, subjected to interleaving per REG (which is an abbreviation for "resource element group" and is formed with four REs) (CCE interleaving), and later mapped to the top of a sub-frame.

As illustrated in FIG. 10, a user terminal deinterleaves the PDCCH mapped to the top first to third OFDM symbols in the subframe. Since the rate matching parameter (the number of CCEs) and the CCE starting position are not clear, the user terminal performs blind decoding in CCE units, and searches for CCEs where the CRC masked by the user ID is OK. In the example illustrated in FIG. 10, a case of terminal UE #3 is shown, and after all possibilities are tried, detection succeeds in CCE #4.

Here, in the event the system band is a 20-MHz component carrier, the number of CCEs is 84, and so searching all possibilities makes the load of terminals significant. So, by limiting the positions subject to blind decoding, the technique called "search space" is employed, in order to reduce the load of terminals.

Figure 11:
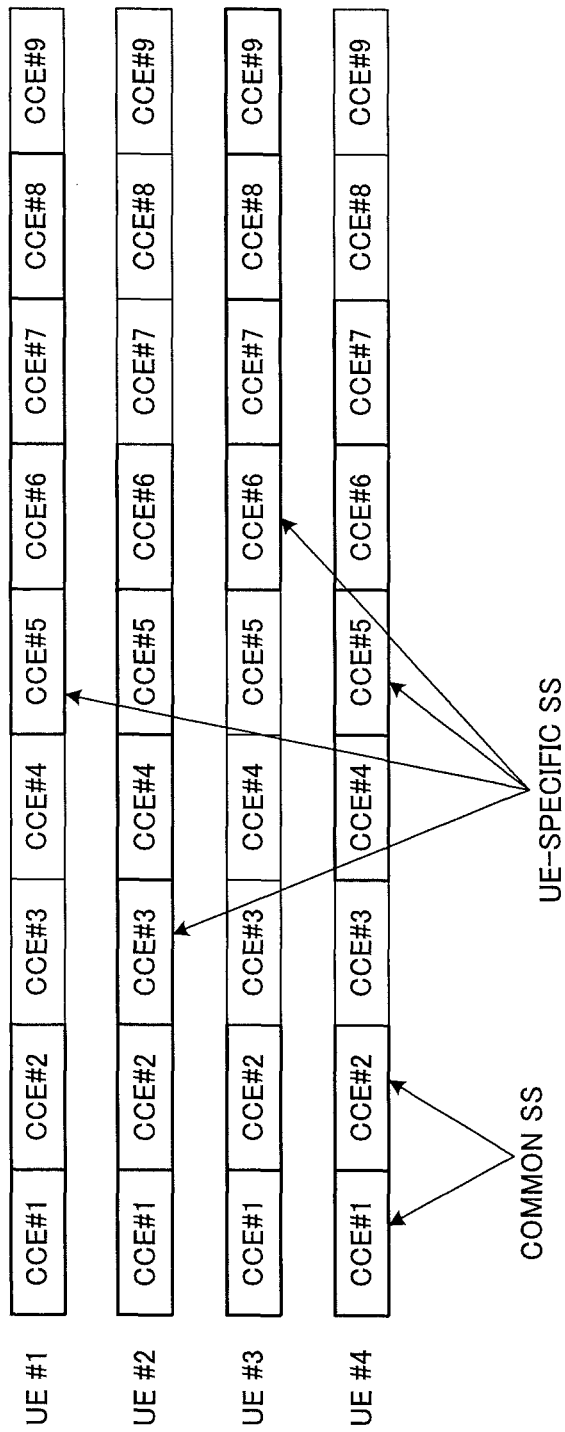
FIG. 11 is a diagram showing a user-common search space and user-specific search spaces according to LTE specifications.

FIG. 11 illustrates examples of two types of search spaces, which are the ranges of blind decoding. As described above, two types of control information are defined in LTE. User-common control information refers to a control channel to transmit information which all user terminals connecting to the same cell need to receive at the same time, and transmits broadcast information, paging information, resource allocation information for transmission power control signal transmission and so on. User-specific control information refers to a control channel to transmit information which only one user terminal needs to receive, and transmits resource allocation information for uplink and downlink shared data channel transmission. As illustrated in FIG. 11, two types of search spaces are defined in association with the above two types of control information, namely the user-common search space and the user-specific search space. The user-common search space is placed in a common position between all user terminals (that is, placed in CCE #1 and CCE #2, which are the top two CCEs). The user-specific search space is placed in an independent position per user terminal (that is, placed randomly depending on the user ID and sub-frame number). In particular, the user-common search space supports two types of formats (1A and 1C), and, to allow high-quality reception at user terminals at cell edges, uses only 4 and 8-CCE aggregations. The numbers of times of blind decoding is 4 and 2. Consequently, in total, the number of times of blind decoding is 12 (2 sizes×(4+2)).

In the above-described PDCCH transmission, for an LTE terminal, the number of bits in the DCI format 1A/1C is determined from the number of RBs (Ns) in a normal component carrier, and, for an LTE-A terminal, the number of bits in the DCI format 1A/1C is determined from the number of RBs (Ns+Ncs) in a concatenated component carrier in which a carrier segment is added to a normal component carrier. Consequently, although the number of bits varies between a normal component carrier and a concatenated component carrier, if the number of bits for the user-common search space is calculated according to the number of bits in the concatenated component carrier to be allocated, there is a possibility that an LTE terminal is unable to receive user-common search space information. So, in order to solve these problems, it is preferable to plan the following measures.

With the present invention, in the event a PDCCH is transmitted targeting an LTE terminal which can support only a normal component carrier and an LTE-A terminal which can support up to a concatenated component carrier, the user-common search space and user-specific search space are allocated to the normal component carrier, the number of bits of control information to transmit in the user-common search space is calculated based on the size of the normal component carrier, and the number of bits to allocate for information (data such as the PDSCH, PUSCH and so on), for which allocation information is reported in the user-specific search space, is calculated based on the size of the system band which each user terminal can support.

By this means, an LTE terminal having received the PDCCH is able to received user-common search space information reliably.

Also, like LTE, as methods of physical channel transmission in radio communication using a system bandwidth of a wide band, there are the distributed transmission method and the localized transmission method.

Figure 12:
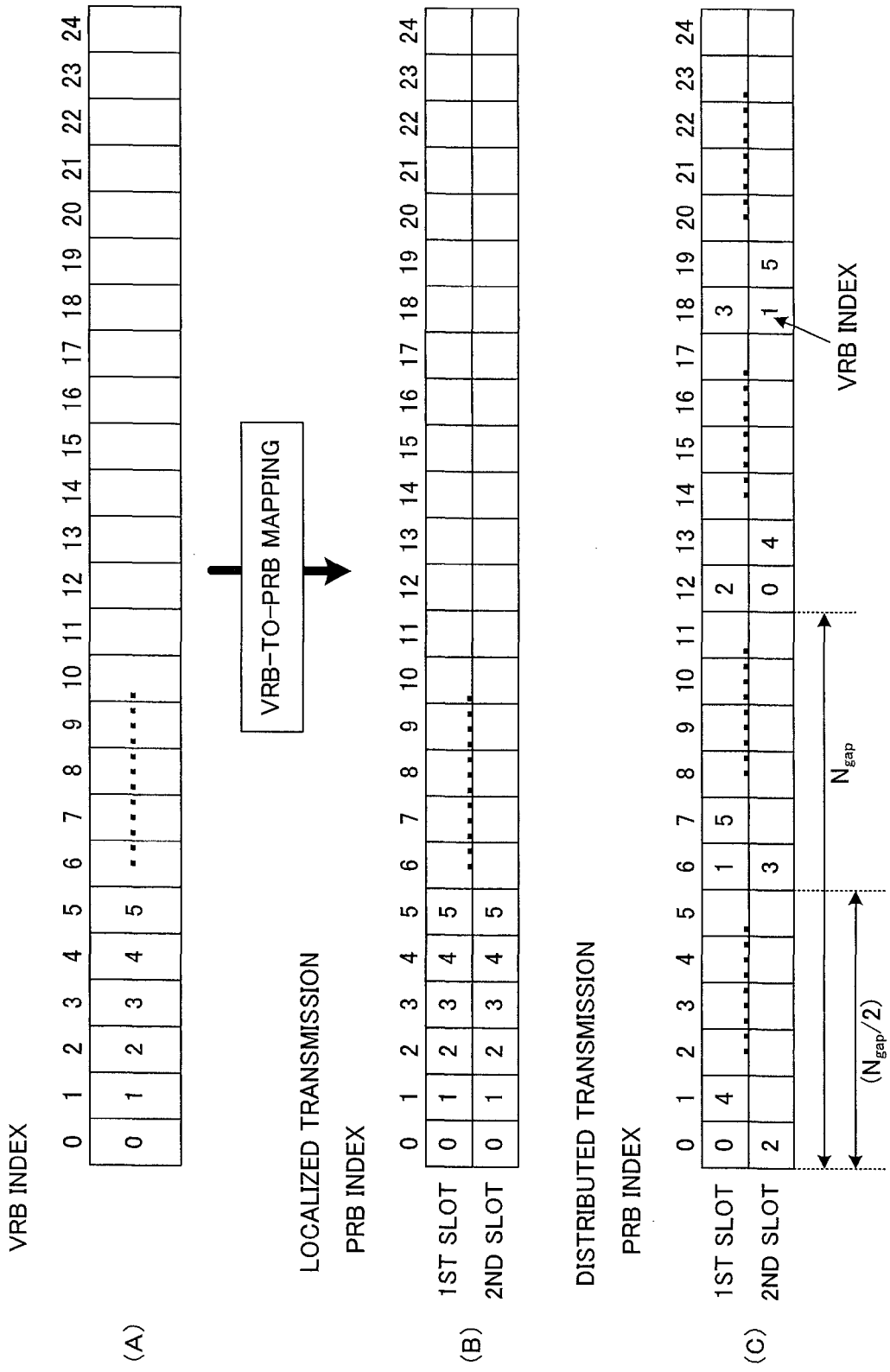
FIG. 12(A) is a diagram showing virtual resource blocks.
FIG. 12(B) is a conceptual diagram of localized transmission.
FIG. 12(C) is a conceptual diagram of distributed transmission.

FIG. 12 illustrates an overview of the distributed transmission method and the localized transmission method. FIG. 12(A) illustrates arrangements of virtual resource blocks (VRBs). In the event of the localized transmission method, as illustrated in FIG. 12(B), virtual resource blocks are mapped to physical resource blocks in the system band, in the order of the indices.

In the distributed transmission method, as illustrated in FIG. 12(C), two VRBs, apart from each other, are divided into two, and two divided VRBs are paired and mapped to physical resource blocks. FIG. 12(C) illustrates a case in which one RB is allocated, where "0 VRB," which is the virtual resource block of index 0, is divided into two, mapped to the physical resource block 0 PRB in the first slot, and mapped to 12 PRB in the physical resource block position that is Ngap apart, in the second slot. Also, 2 VRB of the pair is divided into two, mapped to the physical resource block 12 PRB in the first slot, and mapped to the physical resource block 0 PRB in the second slot. Also, although not illustrated, for example, in the event two RBs are allocated, 0 and 1 VRBs are mapped to the physical resource blocks PRBs 0 and 6 in the first slot, and mapped to the physical resource blocks PRBs 12 and 18 in the second slot. In this way, in the event of the distributed transmission method, by allocating one and two RBs, it is possible to achieve second-order and fourth-order frequency diversity effects. Also, the value of Ngap needs to be set greater if the number of RBs is greater, and therefore relies upon the number of RBs.

In the event distributed transmission is performed in the above-described concatenated component carrier, there is a possibility that the normal component carrier is subject to mapping in the first slot and the carrier segment is subject to mapping in the second slot. There is a problem that an LTE terminal cannot recognize the part mapped to the carrier segment. As a solution to this problem, it is possible to enable an LTE-A terminal to perform distributed transmission including the carrier segment, and enable an LTE terminal to perform distributed transmission confined to the normal component carrier. However, using different configurations upon distributed transmission between LTE and LTE-A results in complexity.

When a concatenated component carrier is formed by concatenating a carrier segment to a normal component carrier, the present invention allocates radio resources to supports distributed transmission only in the range of the normal component carrier and distributed transmission is not performed in the carrier segment.

Figure 13:
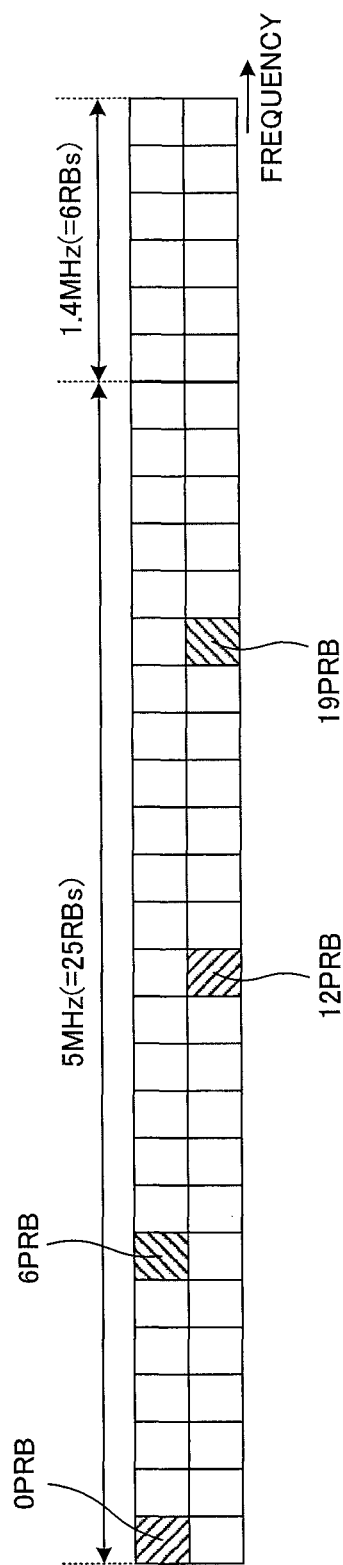
FIG. 13 is a conceptual diagram of distributed transmission according to the present embodiment.

FIG. 13 is a conceptual diagram, where, even in a concatenated component carrier, distributed transmission is supported only in the normal component carrier part. Referring to FIG. 12(A), "0 VRB," which is the virtual resource block of index 0, is divided into two, mapped to the physical resource block 0 PRB in the first slot, and mapped to 12 PRB in the physical resource block position that is Ngap apart, in the second slot. Also, 6 VRB is divided into two, mapped to the physical resource block 6 PRB in the first slot, and mapped to the physical resource block 19 PRB in the second slot. In this way, control is performed such that all virtual resource blocks are allocated physical resource blocks in the normal component carrier (25 RBs), and distributed transmission is not performed in the carrier segment (6 RBs).

By this means, it is possible to prevent complexity due to the difference of the configuration upon distributed transmission, so that an LTE terminal is able to decode signals given by distributed transmission correctly.

Although an improvement with respect to downlink communication control in the event a carrier segment is added has been described above, the following improvement is proposed with respect to the uplink. The uplink physical channel structure in LTE allocates PUCCHs, which are control channels, at both ends of the system band, and adopts intra-subframe frequency hopping in order to achieve a frequency diversity effect. In the event of a concatenated component carrier in which a carrier segment is concatenated to one end of a normal component carrier, if PUCCHs are placed at both ends of the system band in accordance with the LTE specifications, at least one PUCCH is placed on the carrier segment. An LTE terminal is not able to perform transmission in the carrier segment, and therefore a problem arises that a PUCCH cannot be transmitted correctly.

In the event a concatenated component carrier is formed by concatenating a carrier segment to one end of a normal component carrier, the present invention places uplink control channel at both ends of normal component carrier and supports Intra-subframe frequency hopping only in normal component carrier.

FIG. 14(A) is a diagram illustrating an example where, in the event a concatenated component carrier is formed by concatenating a carrier segment to one end of a normal component carrier, uplink control channels are placed at both ends of the normal component carrier. Intra-subframe frequency hopping is adopted between the PUCCHs placed at both ends of the normal component carrier. A PUSCH is allocated to the carrier segment. The transmission of the PUSCH in the carrier segment is supported only by clustered DFT (Discrete Fourier Transform)-spread OFDM. Clustered DFT-spread OFDM converts a transmission signal into the frequency domain by performing DFT spreading, prior to OFDM modulation, divides the frequency components of the transmission signal encoded data/symbol after DFT into a plurality of frequency blocks (clusters), and later inserts a bandwidth to match the system bandwidth in IFFT subcarrier positions, and sets 0 for other frequency components.

By this means, the positions of the PUCCHs, which are uplink control channels, are made common between LTE and LTE-A, so that it is possible to reduce overhead.

Also, in uplink physical channels, frequency hopping is applied in order to achieve a frequency diversity effect. Here, if the PUSCH is destined to hop to the carrier segment, a problem arises where an LTE terminal is unable to transmit the PUSCH. The present invention controls resources such that intra-subframe frequency hopping of the PUSCH is supported only in the normal component carrier and the carrier segment is not a goal of hopping. FIG. 14(B) illustrates an example where, in the event a concatenated component carrier is formed by concatenating a carrier segment to one end of a normal component carrier, radio resources are allocated such that the goal of frequency hopping of a PUSCH is within the range of the normal component carrier. Hereinafter, embodiments of the present invention will be described below in detail with reference to the accompanying drawings. Here, a radio base station apparatus and a mobile terminal apparatus in a mobile communication system in which the LTE system and the LTE-A system overlap, will be described.

Figure 15:
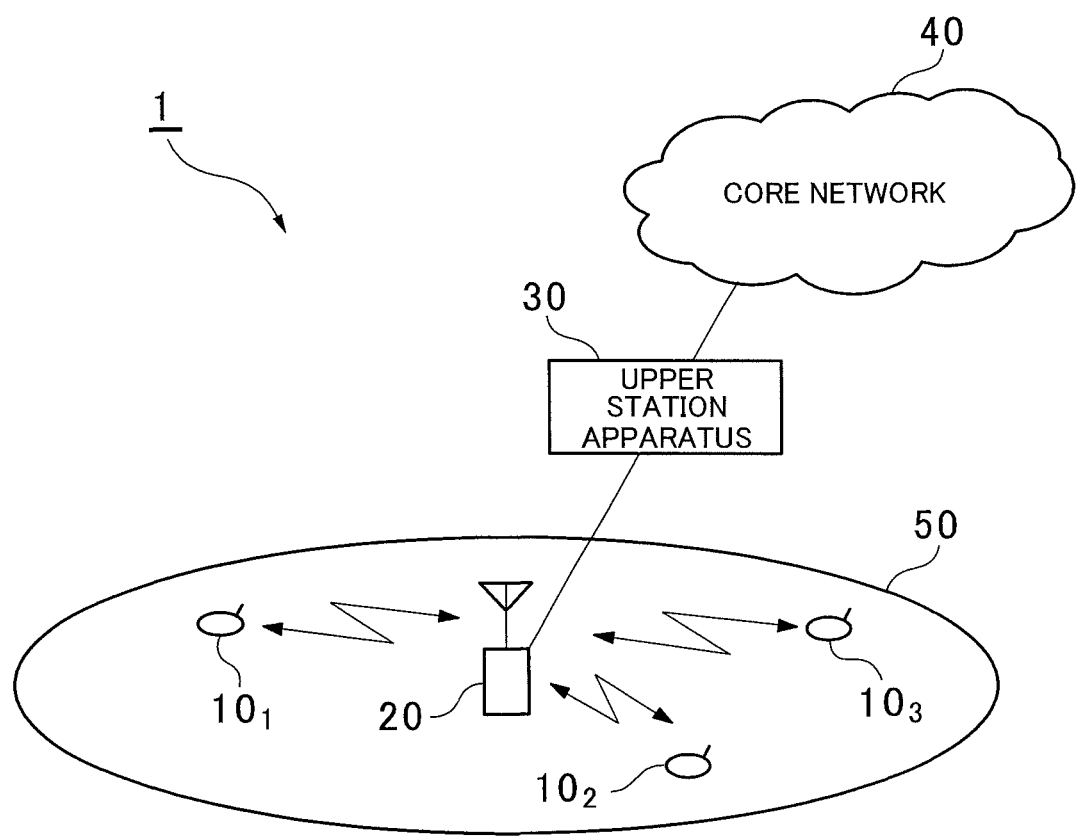
FIG. 15 is a diagram showing a schematic configuration of a mobile communication system according to an embodiment of the present invention.

Referring to FIG. 15, a mobile communication system 1 having a mobile terminal apparatus (UE) 10 and a base station apparatus (Node B) 20 according to an embodiment of the present invention will be described. FIG. 15 is a diagram for explaining a configuration of the mobile communication system 1 having the mobile terminal apparatus 10 and the base station apparatus 20 according to the present embodiment. Note that the mobile communication system 1 illustrated in FIG. 15 is a system to accommodate, for example, the LTE system and the LTE-A system. LTE-A may be referred to as IMT-Advanced or may be referred to as 4G.

As illustrated in FIG. 15, the mobile communication system 1 is configured to include the base station apparatus 20 and a plurality of mobile terminal apparatuses 10 ($10_1$, $10_2$, $10_3$, ... $10_n$, where n is an integer to satisfy n>0) that communicate with this base station apparatus 20. The base station apparatus 20 is connected with an upper station apparatus 30, and this upper station apparatus 30 is connected with a core network 40. The mobile terminal apparatus 10 communicates with the base station apparatus 20 in a cell 50. Note that the upper station apparatus 30 includes, for example, an access gateway apparatus, a radio network controller (RNC), a mobility management entity (MME) and so on, but is by no means limited to these.

The mobile terminal apparatuses ($10_1$, $10_2$, $10_3$, ... $10_n$) include the LTE terminal and the LTE-A terminal, the following description will be given with respect to "mobile terminal apparatus 10," unless specified otherwise. Also, although the mobile terminal apparatus 10 performs radio communication with the base station apparatus 20 for ease of explanation, more generally, user apparatuses (UE: User Equipment) including mobile terminal apparatuses and fixed terminal apparatuses may be used.

In the mobile communication system 1, as radio access schemes, OFDMA (Orthogonal Frequency Division Multiple Access) is applied to the downlink, and SC-FDMA (Single-Carrier Frequency-Division Multiple Access) is applied to the uplink. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing, per terminal, the system band into bands formed with one or continuous resource blocks, and allowing a plurality of terminals to use mutually different bands.

Here, the communication channels in the LTE system will be described. As for the downlink, a PDSCH, which is used by each mobile terminal apparatus 10 on a shared basis, and downlink L1/L2 control channels (including the PDCCH, PCFICH and PHICH) are used. By means of this PDSCH, user data, that is, normal data signals, is transmitted. Transmission data is included in this user data. Note that the component carrier information and scheduling information that are assigned to the mobile terminal apparatus 10 by the base station apparatus 20 are reported to the mobile terminal apparatus 10 by the L1/L2 control channels.

On the uplink, a PUSCH, which is used by each mobile terminal apparatus 10 on a shared basis, and a PUCCH (Physical Uplink Control Channel), which is an uplink control channel, are used. User data is transmitted by means of this PUSCH. Furthermore, by means of this PUCCH, downlink radio quality information (CQI: Channel Quality Indicator), ACK/NACK, and so on, are transmitted.

Figure 16:
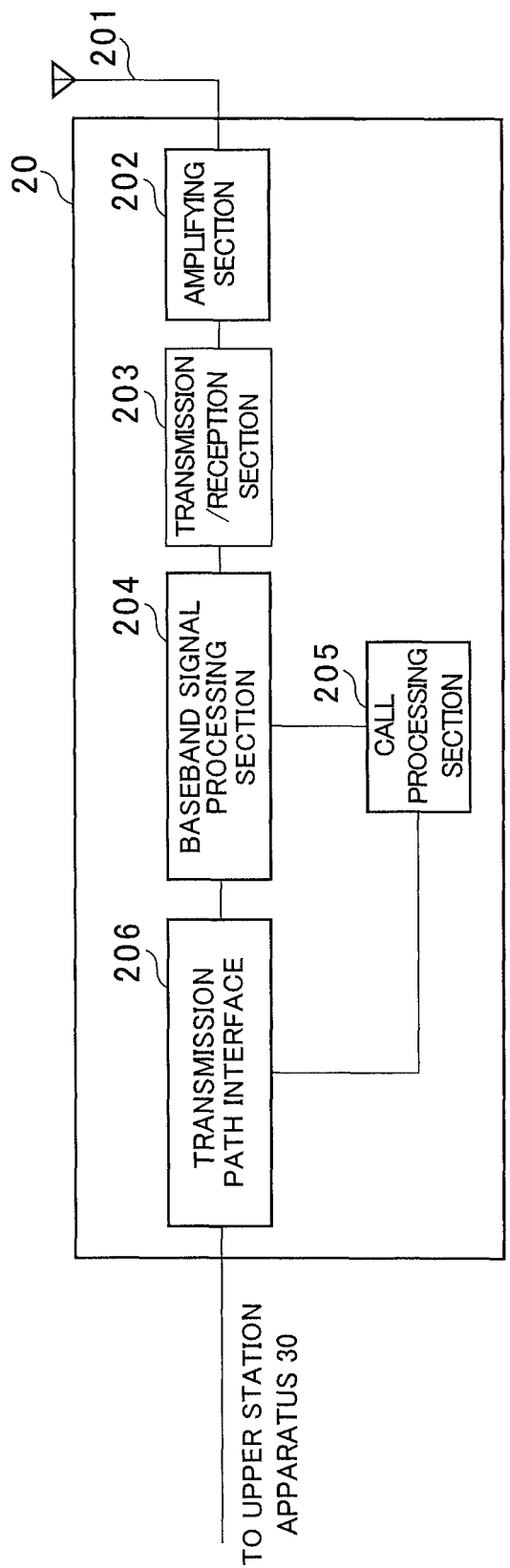
FIG. 16 is a diagram showing a schematic configuration of a radio base station apparatus according to an embodiment of the present invention.

Referring to FIG. 16, an overall configuration of the base station apparatus 20 according to the present embodiment will be described. The base station apparatus 20 has a transmission/reception antenna 201, an amplifying section 202, a transmission/reception section 203, a baseband signal processing section 204, a call processing section 205 and a transmission path interface 206.

User data that is transmitted on the downlink from the base station apparatus 20 to the mobile terminal apparatus 10 is input in the baseband signal processing section 204, through the transmission path interface 206, from the upper station apparatus 30, which is positioned above the base station apparatus 20.

In the baseband signal processing section 204, PDCP layer processing, RLC (Radio Link Control) layer transmission processing such as division and coupling of user data and RLC retransmission control transmission processing, MAC (Medium Access Control) retransmission control, including, for example, HARQ (Hybrid Automatic Repeat reQuest) transmission processing, scheduling, transport format selection, channel coding, inverse fast Fourier transform (IFFT) processing, and precoding processing, are performed. Furthermore, as with signals of the physical downlink control channel, which is a downlink control channel, transmission processing such as channel coding and inverse fast Fourier transform are performed, and the result is transferred to the transmission/reception section 203.

Also, the baseband signal processing section 204 notifies control information for allowing the mobile terminal apparatus 10 to communicate with the base station apparatus 10, to the mobile terminal apparatuses 10 connected to the same cell 50, by a broadcast channel. Broadcast information for communication in the cell 50 includes, for example, the uplink or downlink system bandwidth, identification information of a root sequence (root sequence index) for generating random access preamble signals in the PRACH, and so on.

In the transmission/reception section 203, the baseband signal output from the baseband signal processing section 204 is subjected to frequency conversion processing into a radio frequency band, and, after that, amplified in the amplifying section 202 and transmitted from the transmission/reception antenna 201.

Meanwhile, as for signals to be transmitted on the uplink from the mobile terminal apparatus 10 to the base station apparatus 20, a radio frequency signal that is received in the transmission/reception antenna 201 is amplified in the amplifying section 202, subjected to frequency conversion and converted into a baseband signal in the transmission/reception section 203, and is input to the baseband signal processing section 204.

The baseband signal processing section 204 performs FFT processing, IDFT processing, error correction decoding, MAC retransmission control reception processing, and RLC layer and PDCP layer reception processing of the user data included in the baseband signal that is received as input, and transfers the result to the upper station apparatus 30 through the transmission path interface 206.

The call processing section 205 performs call processing such as setting up and releasing a communication channel, manages the state of the base station apparatus 20 and manages the radio resources.

Figure 17:
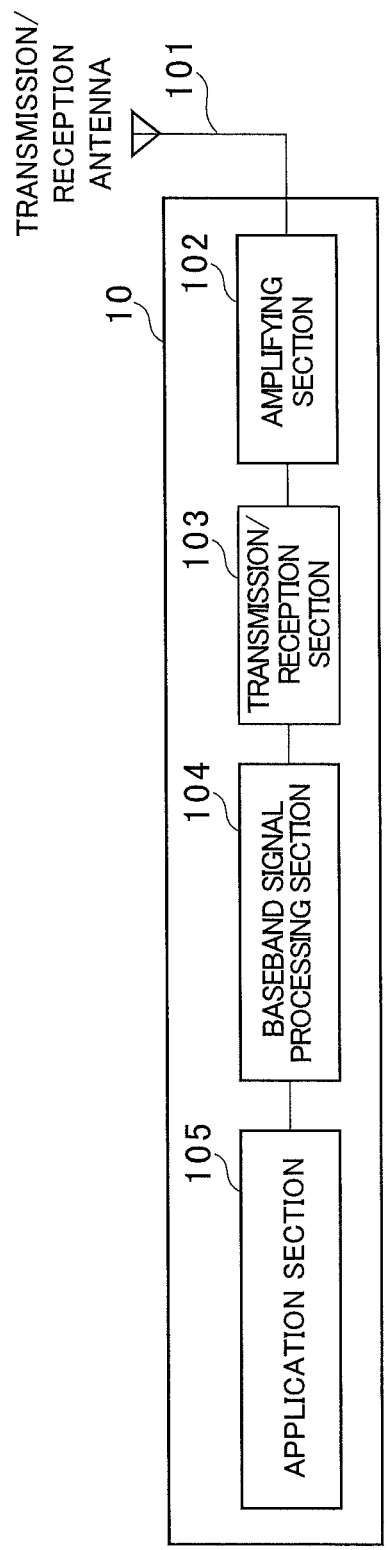
FIG. 17 is a diagram showing a schematic configuration of a mobile terminal apparatus according to an embodiment of the present invention.

Next, referring to FIG. 17, an overall configuration of the mobile terminal apparatus 10 according to the present embodiment will be described. An LTE terminal and an LTE-A terminal have the same principle part configurations and therefore will be described indiscriminately. The mobile terminal apparatus 10 has a transmission/reception antenna 101, an amplifying section 102, a transmission/reception section 103, a baseband signal processing section 104 and an application section 105.

As for downlink data, a radio frequency signal received in the transmission/reception antenna 101 is amplified in the amplifying section 102, and subjected to frequency conversion and converted into a baseband signal in the transmission/reception section 103. This baseband signal is subjected to reception processing such as FFT processing, error correction decoding and retransmission control and so on in the baseband signal processing section 104. In this downlink data, downlink user data is transferred to the application section 105. The application section 105 performs processing related to upper layers above the physical layer and the MAC layer. Also, in the downlink data, broadcast information is also transferred to the application section 105.

On the other hand, uplink user data is input from the application section 105 to the baseband signal processing section 104. In the baseband signal processing section 104, retransmission control (HARQ (Hybrid ARQ)) transmission processing, channel coding, DFT processing, IFFT processing and so on are performed, and the result is transferred to the transmission/reception section 103. The baseband signal output from the baseband signal processing section 104 is subjected to frequency conversion processing in the transmission/reception section 103 and converted into a radio frequency band, and, after that, amplified in the amplifying section 102 and transmitted from the transmission/reception antenna 101.

Figure 18:
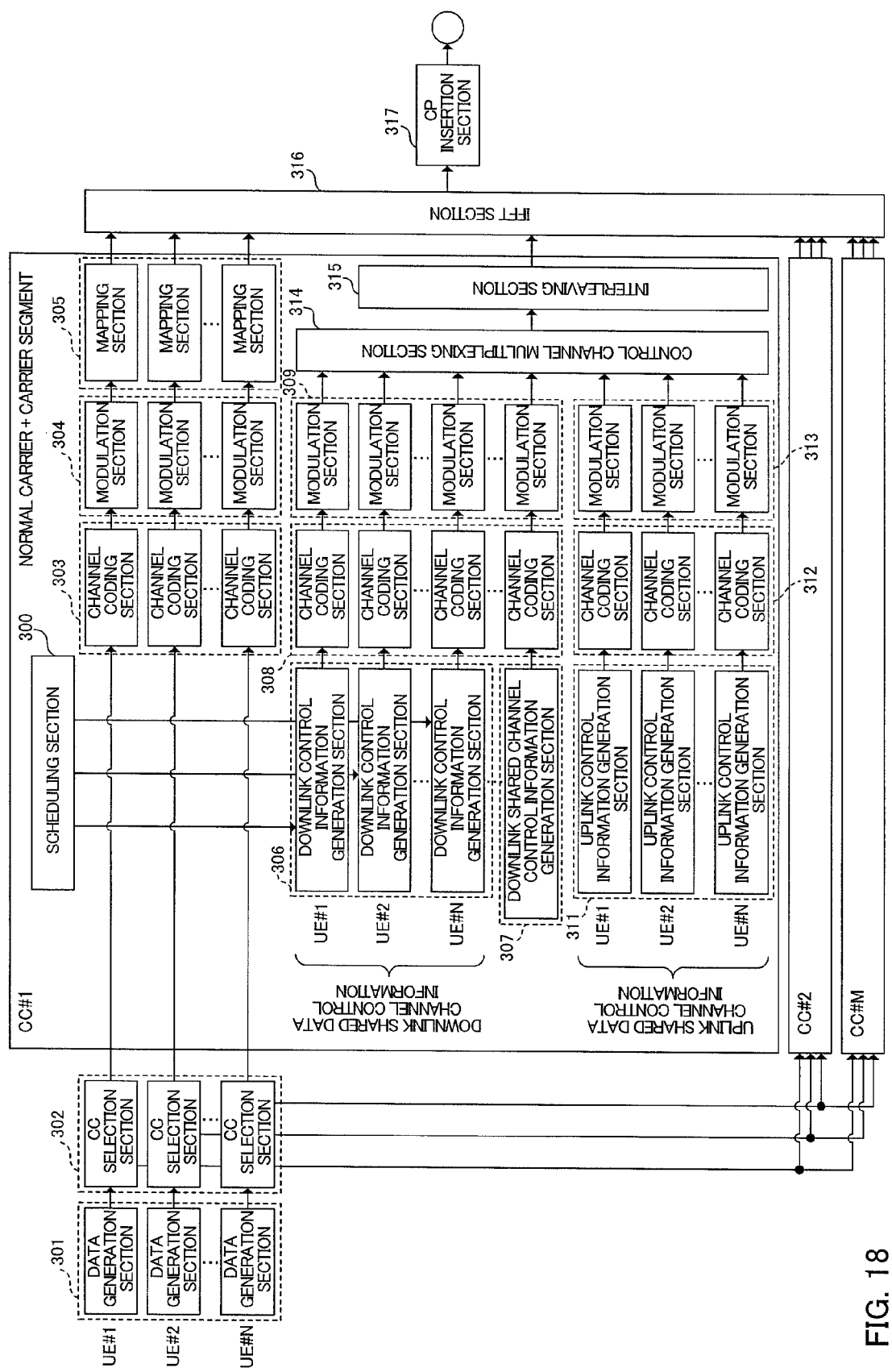
FIG. 18 is a functional block diagram of a baseband processing section in the radio base station apparatus illustrated in FIG. 16.

FIG. 18 is a functional block diagram of a baseband signal processing section 204 provided in the base station apparatus 20 according to the present embodiment, and primarily illustrates the function blocks of the transmission processing section in the baseband signal processing section 204. Transmission data for the mobile terminal apparatus 10 under the base station apparatus 20 is transferred from the upper station apparatus 30 to the base station apparatus 20.

The data generation section 301 outputs transmission data transferred from the upper station apparatus 30 as user data, on a per user basis. The component carrier selection section 302 selects, on a per user basis, component carriers to use for radio communication with the mobile terminal apparatus 10.

Also, in FIG. 18, a base station apparatus configuration to support the mobile communication system 1 where the number of component carriers is M (CC #1 to CC #M) is illustrated as an example. Component carriers CC #1 to CC #M include component carriers formed with a concatenated component carrier and component carriers formed with a normal component carrier alone. For example, as illustrated in FIG. 2(B), component carrier CC #1 is a concatenated component carrier, in which a carrier segment is concatenated to one end of a normal component carrier.

The scheduling section 300 controls resource allocation with respect to component carrier CC #1 (concatenated component carrier), and performs scheduling separately between an LTE terminal user and an LTE-A terminal user. Also, the scheduling section 300 takes into account the carrier segment upon resource allocation for the uplink/downlink shared control channels. Also, the scheduling section 300 receives as input the transmission data and retransmission command from the upper station apparatus 30, and also receives as input the channel estimation values and resource block CQIs from the reception section having measured an uplink signal. The scheduling section 300 schedules uplink/downlink control signals and uplink/downlink shared channel signals with reference to the retransmission command input from the upper station apparatus 30, the channel estimation values and CQIs. A propagation path in mobile communication varies differently per frequency, due to frequency selective fading. So, upon transmission of user data to a user terminal, adaptive frequency scheduling to allocate resource blocks of good communication quality to each user terminal on a per subframe basis, is applied. In adaptive frequency scheduling, for each resource block, a user terminal of good propagation path quality is selected and assigned. Consequently, the scheduling section 300 assigns resource blocks using the CQI of each resource block, fed back from each user terminal. Also, the MCS (Coding rate and Modulation Scheme) that fulfills a required block error rate with the assigned resource blocks is determined.

The baseband signal processing section 204 of the base station apparatus 20 has a channel coding section 303 that performs, on a per user basis, channel coding of a shared data channel (PDSCH) which transmits user data (which may include part of control signals) that is output from the data generation section 301, a modulation section 304 that modulates user data subjected to channel coding on a per user basis, and a mapping section 305 that maps modulated user data to radio resources.

Also, the baseband signal processing section 204 has a downlink control information generation section 306 that generates downlink shared data channel control information, which is user-specific downlink control information, and a downlink shared channel control information generation section 307 that generates downlink shared control channel control information, which is user-common downlink control information. The downlink control information generation section 306 generates a downlink control signal (DCI) from resource allocation information, MCS information, information for HARQ, PUCCH transmission power control command and so on, which are determined on a per user basis. By this means, although the downlink control information generation section 306 generates control information separately between an LTE terminal user and an LTE-A terminal user, the downlink shared channel control information generation section 307 generates downlink shared control channel control information only in normal component carriers. The baseband signal processing section 204 has a channel coding section 308 that performs, on a per user basis, channel coding of control information generated in the downlink control information generation section 306 and the downlink shared channel control information generation section 307, and a modulation section 309 that modulates downlink control information subjected to channel coding.

Also, the baseband signal processing section 204 has an uplink control information generation section 311 that generates, on a per user basis, uplink shared data channel control information, which is control information for controlling an uplink shared data channel (PUSCH), a channel coding section 312 that performs, on a per user basis, channel coding of uplink shared data channel control information generated, and a modulation section 313 that modulates, on a per user basis, uplink shared data channel control information subjected to channel coding. The uplink control information generation section 311 generates uplink shared data channel control information separately between an LTE terminal user and an LTE-A terminal user.

The control information that is modulated on a per user basis in the above modulation sections 309 and 313 is multiplexed in the control channel multiplexing section 314 and furthermore interleaved in an interleaving section 315.

A control signal that is output from the interleaving section 315 and user data that is output from the mapping section 305 are input in an IFFT section 316 as downlink channel signals. The IFFT section 316 converts the downlink channel signal from a frequency domain signal into a time sequence signal by performing an inverse fast Fourier transform. A cyclic prefix insertion section 317 inserts cyclic prefixes in the time sequence signal of the downlink channel signal. Note that a cyclic prefix functions as a guard interval for cancelling the differences in multipath propagation delay. The transmission data to which cyclic prefixes are added, is transmitted to the transmission/reception section 203.

Figure 19:
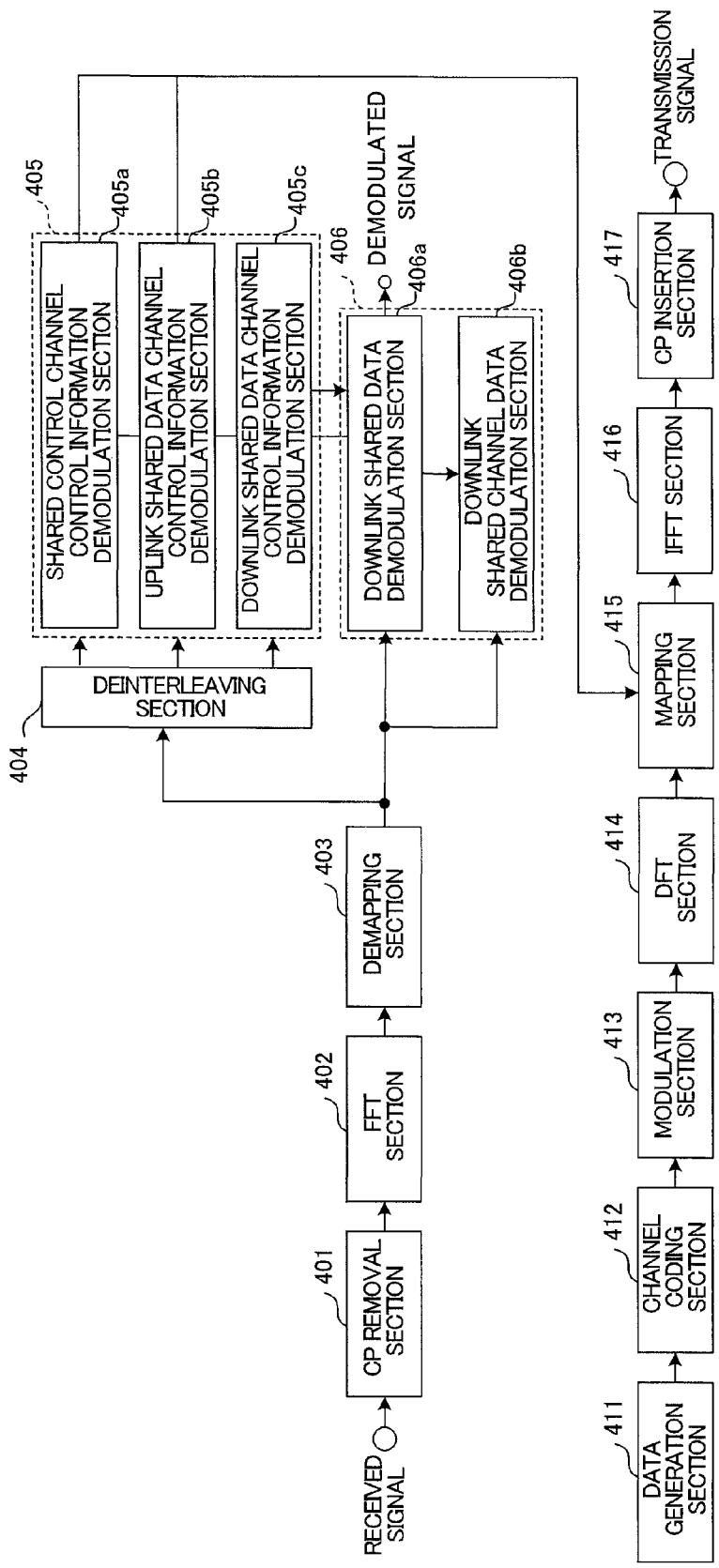
FIG. 19 is a functional block diagram of a baseband processing section in the mobile terminal apparatus illustrated in FIG. 17.

FIG. 19 is a functional block diagram of a baseband signal processing section 104 provided in the mobile terminal apparatus 10, illustrating function blocks of an LTE-A terminal which supports LTE-A. The baseband signal processing section 104 has, as function blocks of the receiving processing system, a CP removing section 401, an FFT section 402, a demapping section 403, a deinterleaving section 404, a control information demodulation section 405 and a data demodulation section 406. The CP removing section 401 removes the cyclic prefixes, which are guard intervals, from a received signal received in the transmission/reception section 103. The FFT section 402 performs a fast Fourier transform on the received signal (OFDM signal), from which the cyclic prefixes have been removed, and, by this means, converts the waveform of time-domain components into an orthogonal multicarrier signal of frequency domain components. The demapping section 403 receives as input the received signal converted into the frequency domain, selects only the subcarriers included in the communication band for targeting data communication, performs puncturing processing of unnecessary subcarriers, and outputs the signal band received signal of the received signal. The deinterleaving section 404 places the control information and user data back in the original order, by rearranging them in an opposite way to the interleaving executed on the transmission side. The control information modulation section 405 has a shared control channel control information modulation section 405a that demodulates shared control channel control information, an uplink shared data channel control information modulation section 405b that demodulates uplink shared data channel control information, and a downlink shared data channel control information modulation section 405c that demodulates downlink shared data channel control information. The shared control channel control information modulation section 405a performs demodulation in accordance with the LTE specifications (processing confined to the normal component carrier), to allow both an LTE terminal and an LTE-A terminal to be able to recognize shared control channel control information. The uplink shared data channel control information modulation section 405b and downlink shared data channel control information modulation section 405c demodulate control information for LTE-A. The data demodulation section 406 has a downlink shared data demodulation section 406 that demodulates a PDSCH, which is a downlink shared data channel, and a downlink shared channel data demodulation section 406b that demodulates broadcast information and paging information, which are downlink shared channel data.

Also, the baseband signal processing section 104 has, as function blocks of the transmission processing system, a data generation section 411, a channel coding section 412, a modulation section 413, a DFT section 414, a mapping section 415, an IFFT section 416 and a CP insertion section 417. The data generation section 411 generates transmission data from bit data that is received as input from the application section 105. The channel coding section 412 applies channel coding processing such as error correction to transmission data, and the modulation section 413 modulates the transmission data after channel coding by QPSK. The DFT section 414 performs a discrete Fourier transform on modulated transmission data. The mapping section 415 maps the frequency components of the data symbol after DFT to subcarrier positions designated by the base station apparatus. That is to say, the mapping section 415 inputs the frequency components of the data symbol in subcarrier positions in the IFFT section 416 having a bandwidth to match the system band, and sets 0 for other frequency components. The IFFT section 416 converts input data matching the system band into time sequence data by performing an inverse fast Fourier transform, and the CP insertion section 417 inserts cyclic prefixes in the time sequence data per data division.

Next, resource block allocation and RB allocation signaling for the mobile terminal apparatus 10, in the base station apparatus 20, will be explained. One of the mobile terminal apparatuses 10, to which component carrier CC #1, which is a concatenated component carrier, will be described as LTE-A terminal UE #1 and LTE terminal UE #2.

Assume that, in the base station apparatus 20, the component carrier selection section 302 selects component carrier CC #1 for LTE-A terminal UE #1 and LTE terminal UE #2. The scheduling section 300 performs scheduling separately between LTE-A terminal UE #1 and LTE terminal UE #2. For LTE-A terminal UE #1, resource allocation is performed using a concatenated component carrier entirely, including the carrier segment, and, for LTE terminal UE #2, resource allocation is performed using the normal component carrier part alone, not including the carrier segment. Resource block allocation is also performed separately between LTE-A terminal UE #1 and LTE terminal UE #2.

With respect to LTE-A terminal UE #1, the scheduling section 300 determines an RBG size corresponding to the system band of component carrier CC #1, based on the table illustrated in FIG. 6. Likewise, with respect to LTE terminal UE #2, the scheduling section 300 determines an RBG size corresponding to the system band of component carrier CC #1, based on the table illustrated in FIG. 6. As described above, although the system band to be recognized in component carrier CC #1 varies between LTE-A terminal UE #1 and LTE terminal UE #2, the same RBG size is selected.

The downlink control information generation section 306 (UE #1) generates RB allocation information for LTE-A terminal UE #1 based on the resource allocation result for LTE-A terminal UE #1. Also, the downlink control information generation section 306 (UE #2) generates RB allocation information for LTE terminal UE #2 based on the resource allocation result for LTE terminal UE #2. The RB allocation information is grouped into one in RBG units and signaled.

In the table illustrated in FIG. 6, the relationships of association between the system band (the number of RBs) and the RBG size are defined to prevent the RBG size from changing between a normal component carrier (the number of NsRBs) and a concatenated component carrier (the number of RBs=Ns+Ncs), in which a carrier segment (the number of RBs=Ncs) is concatenated to that normal component carrier (the number of RBs=Ns).

In this way, by determining the RBG size based on the table illustrated in FIG. 6, it is possible to make the RBG size match between a normal component carrier and a concatenated component carrier, and therefore it is possible to reduce the overhead of RB allocation and prevent RB allocation from being complex.

Also, the scheduling section 300 controls the starting position of a PDSCH separately between an LTE terminal and an LTE-A terminal. As illustrated in FIG. 7, control is performed such that, for mobile terminal apparatus UE #1, resources are allocated such that the starting position of a PDSCH comes to the top RB of a carrier segment, and, for an LTE terminal, the starting position of the PDSCH is aligned to the starting position of a normal component carrier and neither the PDCCH nor a PDCCH is assigned to the carrier segment. The mapping section 305 maps the PDSCH starting position in order from the top RB of a carrier segment, as illustrated in FIG. 7.

Figure 8:
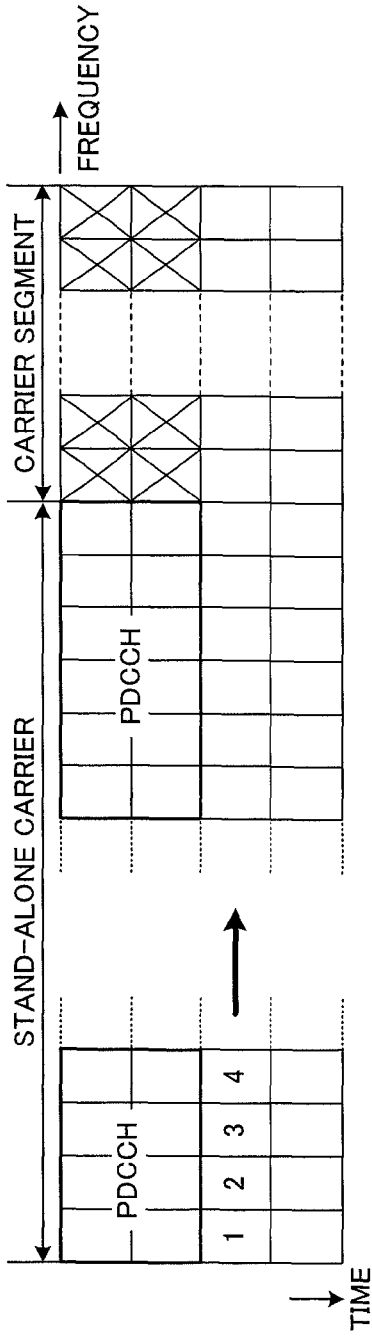
FIG. 8 is a diagram showing a method of performing mapping by aligning the starting position of a PDSCH in a carrier segment with a normal component carrier.
Figure 8:
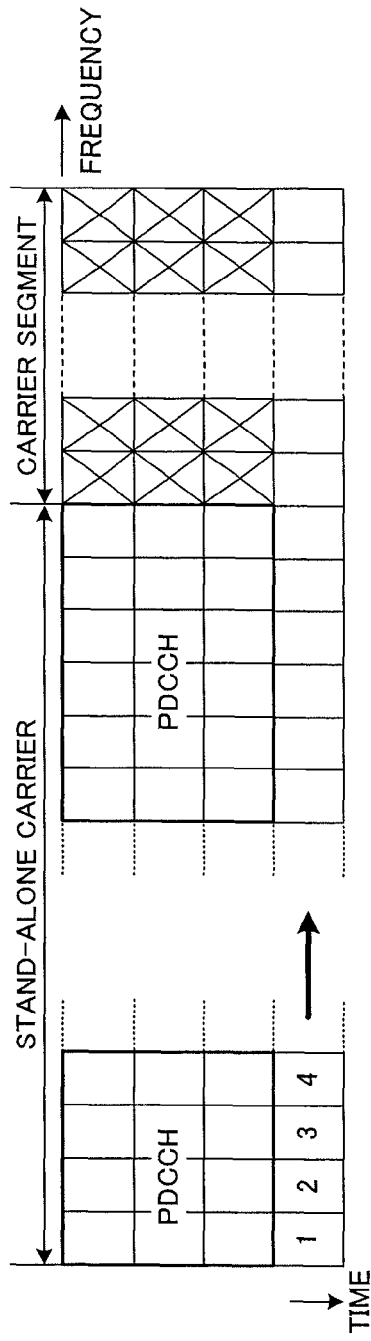
Figure 8:

Alternately, as illustrated in FIG. 8, control is performed such that, for mobile terminal apparatus UE #1, no transmission is performed (that is, the PDSCH is not transmitted) in the carrier segment during the period the PDCCH is transmitted, and the starting position of the PDSCH in the carrier segment is aligned to the starting position of the PDSCH in the normal component carrier. As illustrated in FIG. 8, the mapping section 305 performs mapping such that the starting position of the PDCCH in the carrier segment is aligned with the normal component carrier. RB allocation information for the PDSCH allocated as illustrated in FIG. 7 or FIG. 8, is generated in the downlink control information generation section 306 and transmitted to mobile terminal apparatus UE #1.

For an LTE terminal, the PDSCH is not allocated to the carrier segment, as illustrated in FIG. 7 and FIG. 8, and resource allocation for the PDCCH and PDSCH is performed confined to the normal component carrier.

In the mobile terminal apparatus UE #1, the downlink shared data channel control information modulation section 405c demodulates RB allocation information, and the downlink shared data demodulation section 406a demodulates the PDSCH, including the carrier segment, in accordance with the RB allocation information.

Also, in resource allocation for an LTE terminal and an LTE-A terminal, the scheduling section 300 allocates the user-common search space and user-specific search space to the normal component carrier. Also, the PDCCH size (the number of CCEs) for the user-common search space is calculated based on the size of the normal component carrier part, and the number of bits to allocate (the number of CCEs) for information, for which allocation information is reported in the user-specific search space (data such as PDSCH and PUSCH), is calculated based on the size of the system band which each user terminal can support.

Also, in the event of distributed transmission, as illustrated in FIG. 13, although the scheduling section 300 performs resource allocation such that a VRB is divided into two, one being allocated to the first slot of a PRB and the other one being allocated to a second slot, resources are allocated such that the first slot or second slot is not allocated to the PRB of the carrier segment. That is to say, radio resources are allocated such that distributed transmission is supported only in the normal component carrier and distributed transmission is not performed in the carrier segment.

The downlink control information generation section 306 generates, on a per user basis, control information (PDSCH/PUSCH transmission control information) to be transmitted by a control channel (user-specific PDCCH) to transmit information, which only one user terminal needs to receive, based on the scheduling result by the scheduling section 300. Similar to the scheduling section 300, control information is generated separately between an LTE terminal and an LTE-A terminal. The scheduling section 300 calculates the PDCCH size (the number of CCEs) in the user-specific search space separately between an LTE terminal and an LTE-A terminal. For an LTE terminal, the number of CCEs is calculated targeting only the normal component carrier part, and, for an LTE-A terminals, the number of CCEs is determined targeting the system band of the entire concatenated component carrier, including the carrier segment. The downlink control information generation section 306 generates PDSCH/PUSCH transmission control information, in which the user-specific search space calculated as described above is allocated to the normal component carrier part.

The downlink shared channel control information generation section 307 generates, on a per user basis, control information (SIB/PCH/TPC transmission control information) to be transmitted by a control channel (user-common PDCCH) to transmits information, which all user terminals connected to the same cell need to receive at the same time, based on the scheduling result by the scheduling section 300. The scheduling section 300 calculates the PDCCH size (the number of CCEs) in the user-common search space based on the size of the normal component carrier part, without drawing distinction between an LTE terminal and an LTE-A terminal. The downlink shared channel control information generation section 307 generates SIB/PCH/TPC transmission control information, in which the user-common search space calculated as described above is allocated to the normal component carrier part.

Figure 14:
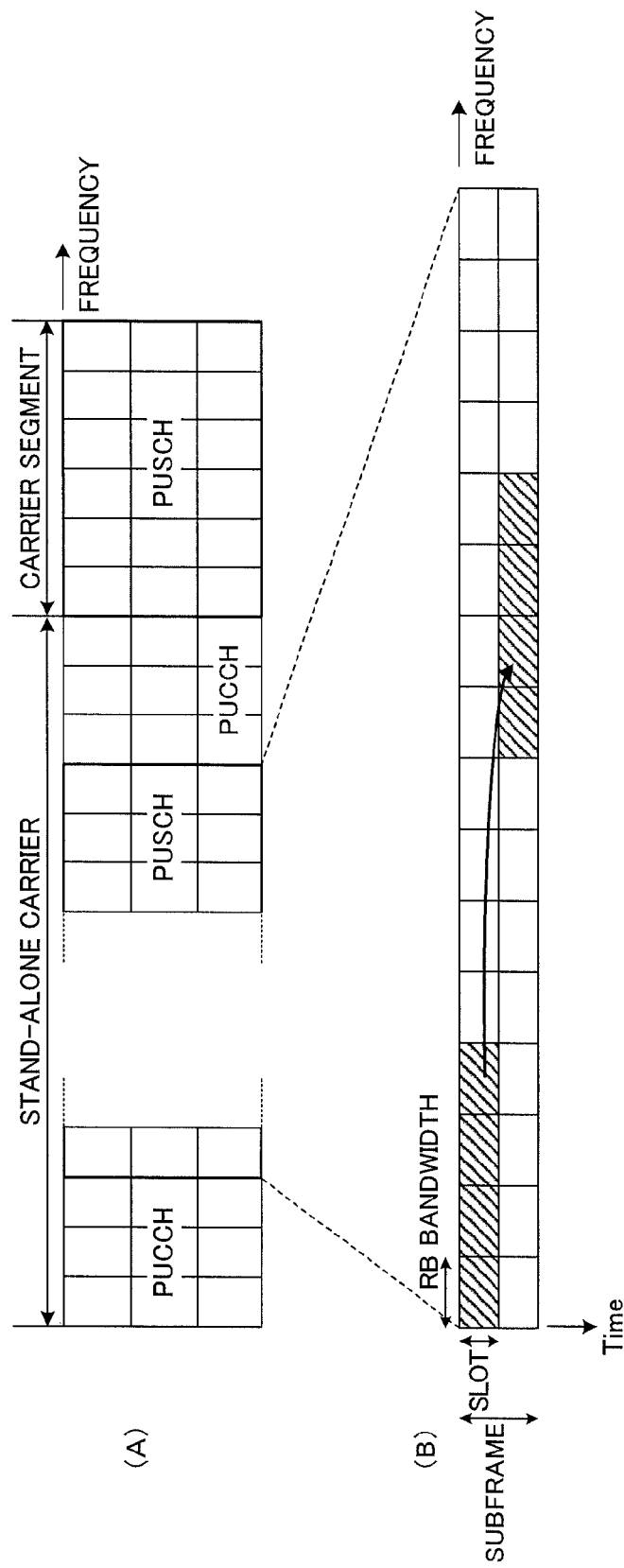
FIG. 14 provides diagrams showing an uplink control channel structure according to the present embodiment.

The uplink control information generation section 311 generates control information for an uplink shared data channel on a per user basis. The scheduling section 300 performs resource allocation for an uplink shared data channel separately between an LTE terminal and an LTE-A terminal. That is to say, for an LTE-A terminal, the scheduling section 300 allocates a PUSCH to the carrier segment as illustrated in FIG. 14, and, for an LTE the scheduling section 300 allocates a PUSCH only to the normal component carrier part. In response to the uplink shared data channel resource allocation result, the uplink control information generation section 311 generates control information for a user-specific shared data channel separately between the LTE terminal and the LTE-A terminal.

The user-specific PDCCH and user-common PDCCH, having been allocated resources as described above, are subject to control channel multiplexing, and transmitted.

In LTE-A terminal UE #1, the shared control channel control information modulation section 405a demodulates the user-common PDCCH by performing blind decoding of the user-common search space, and acquires SIB/PCH/TPC transmission control information. Also, the downlink shared data channel control information modulation section 405c demodulates the user-specific PDCCH by performing blind decoding of the user-specific search space and acquires PDSCH/PUSCH transmission control information. The downlink shared data demodulation section 406a demodulates the PDSCH, including the carrier segment, in accordance with the RB allocation information represented in the PDSCH/PUSCH transmission control information. Furthermore, the uplink shared data channel control information modulation section 405b demodulates the user-specific PDCCH, and acquires control information for the uplink shared data channel. The mapping section 415 maps the frequency components of the uplink control information (PUCCH) and uplink shared data channel (PUSCH), using shared control channel control information (for example broadcast information, paging information, and so on) and uplink shared data channel control information. As illustrated in FIG. 14(A), in the event a carrier segment is subjected to resource allocation for an uplink shared data channel, the PUSCH is mapped to the carrier segment field. Also, in an LTE-A terminal, too, PUCCHs are allocated to both ends of the normal component carrier, subjected to inter-sub-frame frequency hopping and transmitted. Also, as illustrated in FIG. 14(B), mapping is performed such that the PUSCH is subjected to intra-subframe frequency hopping only in the normal component carrier and does not hop to the carrier segment.

Now, although the present invention has been described in detail with reference to the above embodiments, it should be obvious to a person skilled in the art that the present invention is by no means limited to the embodiments described in this specification. The present invention can be implemented with various corrections and in various modifications, without departing from the spirit and scope of the present invention defined by the recitations of the claims. Consequently, the descriptions in this specification are provided only for the purpose of explaining examples, and should by no means be construed to limit the present invention in any way.

The disclosure of Japanese Patent Application No. 2010-003494, filed on Jan. 11, 2010, including the specification, drawings, and abstract, is incorporated herein by reference in its entirety.

The invention claimed is:

1. A base station apparatus comprising:
a selection section configured to select a fundamental frequency block or a concatenated frequency block for radio communication with a user terminal, the fundamental frequency block corresponding to an existing system band, and the concatenated frequency block which is formed by concatenating an additional carrier to the existing system band, being located on a frequency axis;
a resource allocation section configured to perform resource allocation such that, when the user terminal is a terminal of a first specification and is able to support up to the fundamental frequency block, communication is performed based on the first specification using only the fundamental frequency block, and, when the user terminal is a terminal of a second specification and is able to support up to the concatenated frequency block, communication is performed based on the second specification using the concatenated frequency block; and
a communication section configured to perform radio communication with the user terminal in accordance with the resource allocation by the resource allocation section,
wherein the resource allocation section determines an RBG (Resource Block Group) size, which serves as a signaling unit of a resource block, which is a minimum radio resource allocation unit, in accordance with a table that is prepared in advance, the table defining RBG sizes stepwise in association with a plurality of system bands, and being configured such that the RBG size becomes the same between the fundamental frequency block and the concatenated frequency block.

2. The base station apparatus according to claim 1, wherein the resource allocation section allocates resources to the concatenated frequency block selected with respect to the user terminal of the second specification, such that a top resource block of the additional carrier is a starting position of a downlink shared data channel.

3. The base station apparatus according to claim 1, wherein the resource allocation section allocates resources to the concatenated frequency block selected with respect to the user terminal of the second specification, such that a starting position of a downlink shared data channel in the additional carrier is aligned with a starting position of a downlink shared data channel in the fundamental frequency block constituting a system band with the additional carrier.

4. The base station apparatus according to claim 1, wherein, with respect to the concatenated frequency block, the resource allocation section allocates a user-common search space and a user-specific search space to the fundamental frequency block, and calculates a size of the user-common search space based on a size of the fundamental frequency block.

5. The base station apparatus according to claim 1, wherein, with respect to the concatenated frequency block, the resource allocation section allocates radio resources, such that distributed transmission is supported within the fundamental frequency block and distributed transmission is not performed in the additional carrier.

6. The base station apparatus according to claim 1, wherein, with respect to the user terminal of the second specification, the resource allocation section allocates radio resources to an uplink, such that the uplink shared data channel is transmitted in the additional carrier of the concatenated frequency block.

7. A mobile terminal apparatus comprising:
a receiving section configured to receive a downlink signal in a fundamental frequency block or a concatenated frequency block, the fundamental frequency block corresponding to an existing system band, and the concatenated frequency block which is formed by concatenating an additional carrier to the existing system band, being located on a frequency axis; and
a communication control section configured to, when transmitting an uplink control channel in the concatenated frequency block, perform a frequency hopping on the control channel at both ends of the fundamental frequency block in the concatenated frequency block,
wherein an RBG (Resource Block Group) has a size, which serves as a signaling unit of a resource block, which is a minimum radio resource allocation unit, in accordance with a table that is prepared in advance, the table defining RBG sizes stepwise in association with a plurality of system bands, and being configured such that the RBG size becomes the same between the fundamental frequency block and the concatenated frequency block.

8. A mobile terminal apparatus comprising:
a receiving section configured to receive a downlink signal in a fundamental frequency block or a concatenated frequency block, the fundamental frequency block which corresponds to an existing system band, and the concatenated frequency block which is formed by concatenating an additional carrier to the existing system band, are located on a frequency axis; and
a communication control section configured to, when transmitting an uplink shared channel in the concatenated frequency block, perform a frequency hopping of the shared channel on the fundamental frequency block in the concatenated frequency block,
wherein an RBG (Resource Block Group) has a size, which serves as a signaling unit of a resource block, which is a minimum radio resource allocation unit, in accordance with a table that is prepared in advance, the table defining RBG sizes stepwise in association with a plurality of system bands, and being configured such that the RBG size becomes the same between the fundamental frequency block and the concatenated frequency block.

9. A radio communication control method comprising the steps of:
where a fundamental frequency block which corresponds to an existing system band, and a concatenated frequency block which is formed by concatenating an additional carrier to the existing system band, are located on a frequency axis, selecting the fundamental frequency block or the concatenated frequency block for radio communication with a user terminal;
performing resource allocation such that, when the user terminal is a terminal of a first specification and is able to support up to the fundamental frequency block, communication is performed based on the first specification using only the fundamental frequency block, and, when the user terminal is a terminal of a second specification and is able to support up to the concatenated frequency block, communication is performed based on the second specification using the concatenated frequency block;
performing radio communication with the user terminal in accordance with the resource allocation by the resource allocation, and
determining an RBG (Resource Block Group) size, which serves as a signaling unit of a resource block, which is a minimum radio resource allocation unit, in accordance with a table that is prepared in advance, the table defining RBG sizes stepwise in association with a plurality of system bands, and the RBG size becomes the same between the fundamental frequency block and the concatenated frequency block.

* * * * *